US007970657B2

(12) United States Patent
Morgenstern

(10) Patent No.: US 7,970,657 B2
(45) Date of Patent: Jun. 28, 2011

(54) GIVING GIFTS AND DISPLAYING ASSETS IN A SOCIAL NETWORK ENVIRONMENT

(75) Inventor: Jared Morgenstern, Menlo Park, CA (US)

(73) Assignee: Facebook, Inc., Palo Alto, CA (US)

( * ) Notice: Subject to any disclaimer, the term of this patent is extended or adjusted under 35 U.S.C. 154(b) by 571 days.

(21) Appl. No.: 11/796,184

(22) Filed: Apr. 27, 2007

(65) Prior Publication Data
US 2008/0189188 A1    Aug. 7, 2008

Related U.S. Application Data

(60) Provisional application No. 60/899,121, filed on Feb. 2, 2007.

(51) Int. Cl.
G06Q 30/00    (2006.01)
G06F 17/30    (2006.01)
(52) U.S. Cl. ........................ 705/26.1; 705/27.1; 705/319
(58) Field of Classification Search ........... 705/26–27.2, 705/319
See application file for complete search history.

(56) References Cited

U.S. PATENT DOCUMENTS

| | | | |
|---|---|---|---|
| 5,937,413 A | 8/1999 | Hyun | |
| 6,029,141 A | 2/2000 | Bezos | |
| 6,633,849 B1* | 10/2003 | Dodd | ............................. 705/1 |
| 7,013,292 B1 | 3/2006 | Hsu | |
| 7,249,123 B2 | 7/2007 | Elder | |
| 7,269,590 B2 | 9/2007 | Hull | |
| 2001/0037721 A1 | 11/2001 | Hasegawa | |
| 2002/0059201 A1 | 5/2002 | Work | |
| 2002/0120564 A1* | 8/2002 | Strietzel | .......................... 705/40 |
| 2002/0123924 A1* | 9/2002 | Cruz | ............................... 705/10 |
| 2003/0074265 A1* | 4/2003 | Oshima | ........................... 705/26 |
| 2003/0145093 A1 | 7/2003 | Oren | |
| 2003/0172004 A1* | 9/2003 | Anderson | ....................... 705/27 |
| 2003/0222918 A1 | 12/2003 | Coulthard | |
| 2003/0225632 A1 | 12/2003 | Tong | |
| 2003/0233283 A1* | 12/2003 | Shah | ............................... 705/26 |
| 2004/0024846 A1 | 2/2004 | Randall | |
| 2004/0088177 A1 | 5/2004 | Travis | |
| 2004/0148275 A1 | 7/2004 | Achlioptas | |
| 2005/0021750 A1 | 1/2005 | Abrams | |
| 2005/0114759 A1 | 5/2005 | Williams | |
| 2005/0154639 A1 | 7/2005 | Zetmeir | |
| 2005/0159970 A1 | 7/2005 | Buyukkokten | |
| 2005/0171799 A1 | 8/2005 | Hull | |
| 2005/0171955 A1 | 8/2005 | Hull | |
| 2005/0177385 A1 | 8/2005 | Hull | |
| 2005/0197846 A1 | 9/2005 | Pezaris | |

(Continued)

OTHER PUBLICATIONS funhi.com http://funhi.com/ Internet Archive (Jan. 13, 2006)—http://web.archive.org/web/20060113150449/funhi.com/.*

(Continued)

*Primary Examiner* — Will Allen
*Assistant Examiner* — Kathleen Davison
(74) *Attorney, Agent, or Firm* — Fenwick & West LLP

(57) ABSTRACT

A system and method is described for giving gifts via a social network and displaying icons representing assets that have been acquired via the social network. In various embodiments, the assets include real assets, digital assets, and virtual assets. Digital assets that have been acquired via the social network environment may also be displayed. In some embodiments, the assets are received as gifts or in trade from another user of the social network environment.

52 Claims, 16 Drawing Sheets

U.S. PATENT DOCUMENTS

| | | |
|---|---|---|
| 2005/0198020 A1 | 9/2005 | Garland |
| 2005/0198031 A1 | 9/2005 | Pezaris |
| 2005/0198305 A1 | 9/2005 | Pezaris |
| 2005/0203807 A1 | 9/2005 | Bezos |
| 2005/0216300 A1 | 9/2005 | Appelman |
| 2005/0216550 A1 | 9/2005 | Paseman |
| 2005/0235062 A1 | 10/2005 | Lunt |
| 2005/0256756 A1 | 11/2005 | Lam |
| 2006/0036503 A1* | 2/2006 | Schweier et al. ............... 705/26 |
| 2006/0041543 A1 | 2/2006 | Achlioptas |
| 2006/0042483 A1 | 3/2006 | Work |
| 2006/0048059 A1 | 3/2006 | Etkin |
| 2006/0052091 A1 | 3/2006 | Onyon |
| 2006/0080613 A1* | 4/2006 | Savant ......................... 715/745 |
| 2006/0085419 A1 | 4/2006 | Rosen |
| 2006/0122926 A1* | 6/2006 | Hsu et al. ........................ 705/35 |
| 2006/0136419 A1 | 6/2006 | Brydon |
| 2006/0143183 A1 | 6/2006 | Goldberg |
| 2006/0161599 A1 | 7/2006 | Rosen |
| 2006/0184617 A1 | 8/2006 | Nicholas |
| 2006/0190281 A1* | 8/2006 | Kott et al. ......................... 705/1 |
| 2006/0194186 A1 | 8/2006 | Nanda |
| 2006/0218225 A1 | 9/2006 | Hee Voon |
| 2006/0229063 A1 | 10/2006 | Koch |
| 2006/0230061 A1 | 10/2006 | Sample |
| 2006/0247940 A1 | 11/2006 | Zhu |
| 2006/0248573 A1 | 11/2006 | Pannu |
| 2006/0256008 A1 | 11/2006 | Rosenberg |
| 2006/0265227 A1 | 11/2006 | Sadamura |
| 2006/0293976 A1 | 12/2006 | Nam |
| 2007/0002057 A1* | 1/2007 | Danzig et al. ................. 345/473 |
| 2007/0067271 A1* | 3/2007 | Lu ..................................... 707/3 |
| 2007/0174389 A1 | 7/2007 | Armstrong |
| 2007/0208627 A1* | 9/2007 | Abadi ............................. 705/26 |
| 2007/0208916 A1 | 9/2007 | Tomita |
| 2007/0282987 A1 | 12/2007 | Fischer |
| 2008/0005076 A1 | 1/2008 | Payne |
| 2008/0010343 A1 | 1/2008 | Escaffi |
| 2008/0033776 A1 | 2/2008 | Marchese |
| 2008/0040428 A1 | 2/2008 | Wei |
| 2008/0070697 A1 | 3/2008 | Robinson |
| 2008/0086458 A1 | 4/2008 | Robinson |
| 2009/0094134 A1* | 4/2009 | Toomer et al. .................. 705/26 |

OTHER PUBLICATIONS

Flores, Fernando et al. "Computer systems and the design of organizational interaction." In ACM Transactions on Information Systems (TOIS), vol. 6, Issue 2, Apr. 1988.

CHIPIN. Chipin: The easy way to collect money [online], Dec. 15, 2006 http://web.archive.org/web/2006121509739/www.chipin.com/overview.

Parzek, E. Social Networking to Chipin to a Good Cause [online]. Business Design Studio, Jun. 29, 2006 http://www.businessdesignstudio.com/resources/blogger/2006/06social-networking-tochipin-to-good.html.

U.S. Appl. No. 11/639,655, Mark Zuckerberg, System and Methods for Social Mapping, filed Dec. 14, 2006.

U.S. Appl. No. 11/646,206, Aaron Sittig, System and Methods for Generating a Social Timeline, filed Dec. 26, 2006.

U.S. Appl. No. 11/493,291, Mark Zuckerberg, System and Methods for Dynamically Generating a Privacy Summary, filed Jul. 25, 2006.

U.S. Appl. No. 11/701,698, Jed Stremel, System and Methods for Digital File Distribution, filed Feb. 2, 2007.

U.S. Appl. No. 11/713,455, Jed Stremel, System and Methods for Automatically Locating Web-Based Social Network Members, filed Feb. 28, 2007.

U.S. Appl. No. 11/701,566, Jed Stremel, System and Method for Automatic Population of a Contact File with Contact Content and Expression Content, filed Feb. 2, 2007.

U.S. Appl. No. 11/502,757, Andrew Bosworth, Systems and Methods for Generating Dynamic Relationship-Based Content Personalized for Members of a Web-Based Social Network, filed Aug. 11, 2006.

U.S. Appl. No. 11/503,093, Andrew Bosworth, Systems and Methods for Measuring User Affinity in a Social Network Environment, filed Aug. 11, 2006.

U.S. Appl. No. 11/503,037, Mark Zuckerberg, System sand Methods for Providing Dynamically Selected Media Content to a User of an Electronic Device in a Social Network Environment, filed Aug. 11, 2006.

U.S. Appl. No. 11/503,242, Mark Zuckerberg, System and Method for Dynamically Providing a News Feed About a User of a Social Network, filed Aug. 11, 2006.

U.S. Appl. No. 11/499,093, Mark Zuckerberg, Systems and Methods for Dynamically Generating Segmented Community Flyers, filed Aug. 2, 2006.

U.S. Appl. No. 11/580,210, Mark Zuckerberg, System and Method for Tagging Digital Media, filed Oct. 11, 2006.

U.S. Appl. No. 11/893,493, Arieh Steinberg, Web-Based Social Network Badges, filed Aug. 15, 2007.

U.S. Appl. No. 11/982,974, Ruchi Sanghvi, Systems and Methods for a Web-Based Social Networking Environment Integrated Within One or More Computing and/or Networking Applications, filed Nov. 5, 2007.

U.S. Appl. No. 11/701,595, Ezra Callahan, System and Method for Determining a Trust Level in a Social Network Environment, filed Feb. 2, 2007.

U.S. Appl. No. 11/726,962, Charlie Cheever, System and Method for Confirming an Association in a Web-Based Social Network, Mar. 23, 2007.

U.S. Appl. No. 11/701,744, Andrew Bosworth, System and Method for Curtailing Objectionable Behavior in a Web-Based Social Network, Feb. 2, 2007.

U.S. Appl. No. 11/893,797, Yun-Fang Juan, System and Method for Invitation Targeting in a Web-Based Social Network, Aug. 16, 2007.

U.S. Appl. No. 11/893,820, Yun-Fang Juan, Systems and Methods for Keyword Selection in a Web-Based Social Network, Aug. 16, 2007.

U.S. Appl. No. 11/899,426, Jared Morgenstern, System and Method for Collectively Giving Gifts in a Social Network Environment, filed Sep. 5, 2007.

U.S. Appl. No. 12/072,003, Arieh Steinberg, Systems and Methods for Implementation of a Structured Query Language Interface in a Distributed Database Environment, filed Feb. 21, 2008.

U.S. Appl. No. 12/077,070, Dave Fetterman, Systems and Methods for Network Authentication, filed Mar. 13, 2008.

U.S. Appl. No. 12/154,504, Adam D'Angelo, Personalized Platform for Accessing Internet Applications, filed May 23, 2008.

U.S. Appl. No. 12/156,091, Mark Zuckerberg, Systems and Methods for Auction Based Polling, filed May 28, 2008.

U.S. Appl. No. 12/151,734, Jared Morgenstern, Systems and Methods for Classified Advertising in an Authenticated Web-Based Social Network, filed May 7, 2008.

U.S. Appl. No. 12/154,886, Nico Vera, Systems and Methods for Providing Privacy Settings for Applications Associated with a User Profile, filed May 27, 2008.

U.S. Appl. No. 11/893,559, Adam D'Angelo, Platform for Providing a Social Context to Software Applications, filed Aug. 15, 2007.

U.S. Appl. No. 12/080,808, Peter Deng, Systems and Methods for Calendaring, filed Apr. 2, 2008.

* cited by examiner

GIVING GIFTS AND DISPLAYING ASSETS IN A SOCIAL NETWORK ENVIRONMENT

CROSS-REFERENCE TO RELATED APPLICATIONS

This application claims benefit and priority of U.S. Patent Application Ser. No. 60/899,121 filed on Feb. 2, 2007, entitled "System and Method for Automatically Giving Gifts and Displaying Assets in a Social Network Environment."

This application is related to:

U.S. patent application Ser. No. 11/639,655 filed on Dec. 14, 2006, entitled "Systems and Methods for Social Mapping," which in turn claims the benefit and priority of U.S. Provisional Patent Application Ser. No. 60/750,844 filed on Dec. 14, 2005, entitled "Systems and Methods for Social Mapping,"

U.S. patent application Ser. No. 11/502,757 filed on Aug. 11, 2006, entitled "Systems and Methods for Generating Dynamic Relationship-Based Content Personalized for Members of a Web-Based Social Network,"

U.S. patent application Ser. No. 11/503,093 filed on Aug. 11, 2006, entitled "Systems and Methods for Measuring User Affinity in a Social Network Environment,"

U.S. patent application Ser. No. 11/503,037 filed on Aug. 11, 2006, entitled "Systems and Methods for Providing Dynamically Selected Media Content to a User of an Electronic Device in a Social Network Environment,"

U.S. patent application Ser. No. 11/503,242 filed on Aug. 11, 2006, entitled "System and Method for Dynamically Providing a News Feed About a User of a Social Network,"

U.S. patent application Ser. No. 11/580,210 filed on Oct. 11, 2006, entitled "System and Method for Tagging Digital Media,"

U.S. patent application Ser. No. 11/701,698 filed on Feb. 2, 2007, entitled "System and Method for Digital File Distribution."

The disclosures of all of the above U.S. patents and patent applications are incorporated by reference herein.

BACKGROUND OF THE INVENTION

1. Field of the Invention

The present invention relates generally to social networks, and more particularly to automatically displaying gifts and purchases to members of a social network.

2. Description of Related Art

Conventionally, a user of a networking website connects with other users by providing information about the user to a social network website for access by the other users. For example, a user may post contact information, background information, current job position, hobbies, and so forth. Information about personal events may also be posted by a user, for example on personal webpages, web logs (BLOGS), etc. Such posts may include information about gifts received, gifts given, purchases made, etc. Other users may contact the user and/or review information about the user based on common interests or for any other reason.

Recently, social networking websites have developed systems for tailoring connections between various users. For example, users may be grouped based on geographical location, job type, and so forth. Social networking offers users the opportunity for frequent, automatic notification of changes in the information posted by other users. There are existing mechanisms that allow a user to display information about other users within a group. Typically, however, these mechanisms require some initiative on the part of the user and are not displayed in a coherent, consolidated manner.

SUMMARY OF THE INVENTION

The present invention includes systems and methods for displaying an icon or an asset. The icon represents an asset purchased via a social network environment administered by a social network server (e.g. Facebook). The asset may be purchased for personal use or as a gift and given to another user. The icon may be visible to other social network members visiting the webpage of the asset owner. The icon may be displayed on the Profile, Shares, Notes, Photos, section of a webpage belonging to a user or elsewhere, depending on the nature of the asset. The icon notifies other members of actual, verified possession of the asset. The icon itself may also be an asset.

An icon may represent various types of assets including real assets, digital assets, or virtual assets. In some embodiments, the present invention includes systems and methods for displaying the icon. Display of an icon may be useful for indicating status. For example, display of an icon representing the latest model IPOD may indicate ownership to other members of the social network. Display of an icon may also be useful for gift exchange. For example an IPOD icon means that the user already owns an IPOD. Thus, a second IPOD would probably not be an appropriate gift, while IPOD accessories and tunes might be appropriate gifts. Similarly, a play list represented by a list of icons gives clues as to preferences in music and may be used to select an appropriate gift for the user. In some embodiments, the present invention includes systems and methods for displaying the digital asset in addition to the icon.

Display of an icon may also be useful for trade over the social network. Icons and/or assets may be created by other social network members and traded via the social network. In further embodiments, icon display may generate revenue sharing between the social network provider and a social network user for an icon displayed on the social network.

In some embodiments, the present invention includes systems and methods for purchasing a real, digital or virtual asset and automatically giving the asset as a gift to another user. The gift may represent a relationship, and/or the quality of the relationship, between the recipient and the user who gave the gift. The gift may also represent appreciation, respect, or esteem from other members of the social network. In various embodiments, a gift may be given for a birthday, a baby shower, an anniversary, Christmas, graduation, etc.

In some embodiments, the present invention includes a method for representing ownership of an asset in a social network environment. For example, the social network provider receives a request from a user of the social network environment to purchase the asset such as a digital asset, and purchases the asset from a vendor on behalf of the user. The social network provider then displays an association, such as an icon, between the purchased asset and the user within the social network environment.

In some embodiments, the present invention includes a method for buying a gift in a social network environment. For example, the social network provider receives a request from a first user of the social network environment to purchase the gift and receives an identity of a second user of the social network environment designated to receive the gift. The social network provider also purchases the gift, such as a virtual gift, from a vendor and provides the gift to the second user. The Social network provider further displays an association, such as an icon representing the virtual gift, between the gift and the second user, on a webpage associated with the second user in the social network environment.

DETAILED DESCRIPTION

Figure 1:
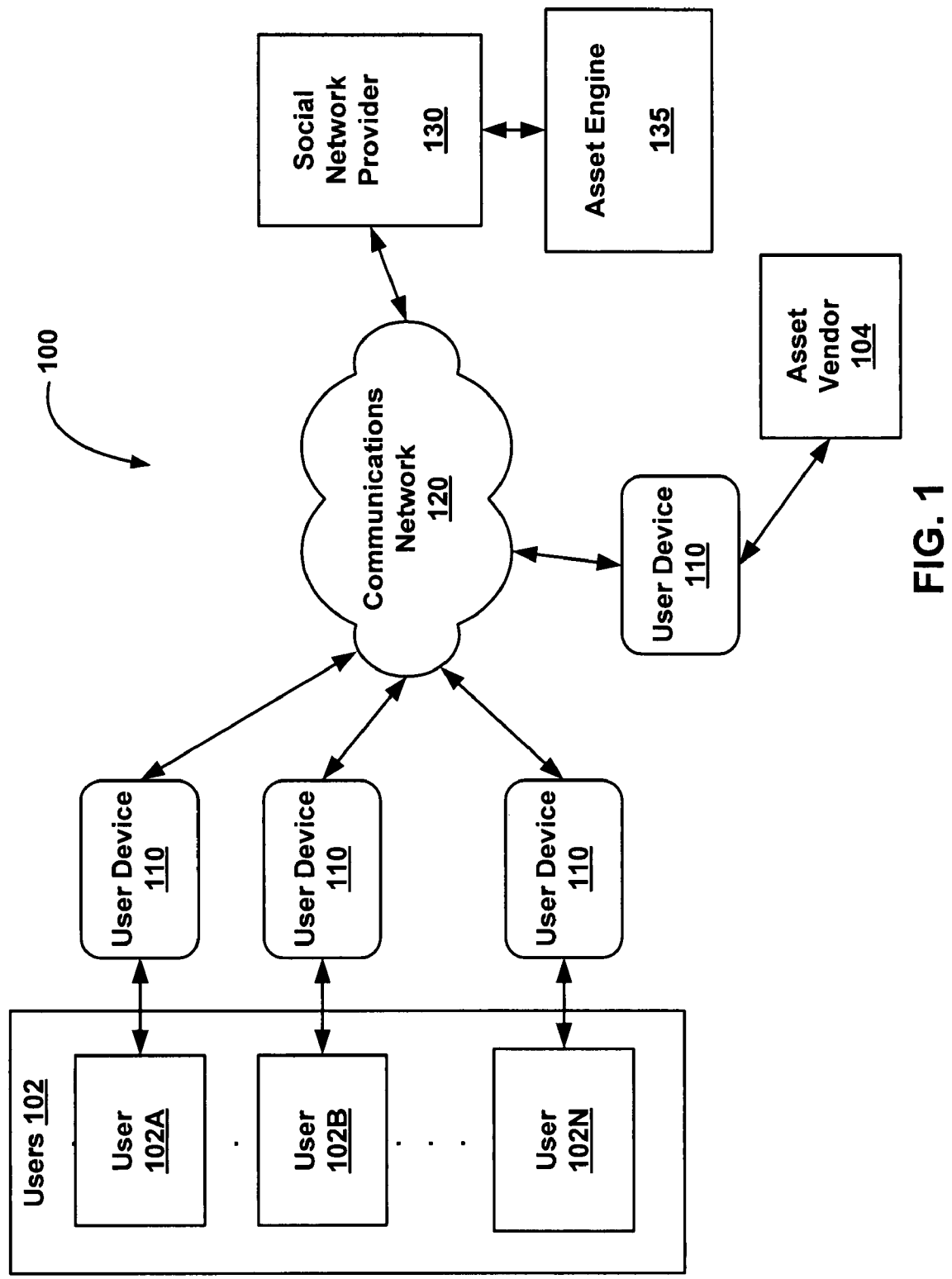
FIG. 1 illustrates an exemplary environment for displaying an asset in a social network environment.

FIG. 1 illustrates an exemplary environment 100 for purchasing, giving, and displaying assets, in a social network. One or more users 102 namely, 102A-102N, at user devices 110, are coupled to a social network provider 130 via a communications network 120. In various embodiments, user devices 110 may include a computer terminal, a personal digital assistant (PDA), a wireless telephone, a digital camera, and so forth. In various embodiments, the communications network 120 may include a local area network (LAN), a wide area network (WAN), a wireless network, an intranet, an internet, and etc. In one embodiment, the users 102 comprise various types of users, including a user 102A who purchases an asset via the social network environment 100, a recipient user 102B who receives a gift from the user 102A, and a user 102C who may view icons an/or assets via the social network environment. An asset vendor 104 provides an asset to the social network environment 100. In some embodiments, the asset vendor 104 may communicate directly with the social network provider 130.

In various embodiments, the user 102A may purchase real assets, digital assets, and/or virtual assets. A real asset includes tangible goods such as a personal digital assistant (PDA), a digital audio player, an article of clothing, a vehicle, etc. In various embodiments, digital assets include digital images, digital video, digital audio, digital audiovisual media, digital text, digital books, online game icons, online game avatars, etc. For the purposes of illustration, digital audio and/or digital video are discussed herein. However, one skilled in the art will understand that the discussion applies equally to a wide variety of digital media, and that the use of digital audio and/or digital video as examples is not intended to be limiting. A real asset may include embodiments of a digital asset. For example, a compact disk (CD) containing music is a real asset. However, the CD includes digital data which may be transferred independently of the CD over the communications network 120 as a digital asset in the form of a digital audio file. Similarly, a book is a real asset. However, text and images in the book may also be represented as data and the data can be transferred over the communications network 120 among users 102 of a social network environment 100.

An icon may have properties of a virtual asset or a digital asset. An icon may represent a digital asset and/or a real asset owned by a user 102. In various embodiments, an icon may represent a file, an application, an applet, a hyperlink, and so forth. In addition to representing assets, such as digital assets, an icon may include digital images, animations, digital video. For example, an icon may comprise an animation that emits a particular sound or audio pattern when a cursor passes over or near the icon. As is well known an icon can link to a digital audio, an applet, or a script when a cursor crosses the icon. Alternatively, an icon may represent no more than a decoration on the screen of the user device 110, or intrinsic value to the user 102 in possession of the icon. An icon may serve as a digital "sticker" having intrinsic value to a user 102 by virtue of a limited supply for collecting and/or trading or due to artistic merit.

In some embodiments, a virtual asset may be an online game asset (e.g., an avatar, game money, an in-game object, a music file, a game life, game health, game power, etc), a movie pass, a redemption coupon, credit, a gift certificate, an airline ticket, etc. Another example of a virtual asset is an indication of a level of achievement (e.g., a skill level in a game, an accumulation of friends in a social network environment, airline miles, number of movies rented, number of books read at a library, number of nights at a hotel, etc). As is well known such virtual assets are regularly bought and sold, for example airline miles, or skill levels in a game. In some embodiments, a virtual asset is redeemable outside of the social network environment. For example, airline miles can be redeemed at an airline counter as tickets or upgrades. In another example, movie passes can be redeemed at a theater. In further embodiments, virtual assets may be featured in auctions or similar environments. Alternatively, icons may themselves be virtual assets.

The social network provider 130 is an entity or person that provides social networking services, communication services, dating services, company intranets, and/or online games, etc. For example, the social network provider 130 may host a website that allows one or more users 102 at one or more user devices 110 to communicate with one another via the communications network 120. The social network environment 100 may offer a user 102 an opportunity to connect with one or more other users 102 who have attended, for example, the same university. In some embodiments, a social network environment 100 includes a segmented community, such as a separate, exclusive or semi-exclusive subset of the social network environment 100, or social network environment 100 wherein only users 102 who are authenticated segmented community members may access and interact with other members of their respective segmented community. According to various embodiments, one or more social networks, i.e., groupings of users, are provided for each user 102 within the social network environment 100. Examples of such groupings are set forth in further detail in U.S. patent application Ser. No. 11/639,655, on Dec. 14, 2006, titled "Systems and Methods for Social Mapping."

The social network environment 100 may further offer users 102 an opportunity to connect with one or more asset vendors 104. An asset vendor 104 provides assets for purchase by one or more users 102 via the network. The asset vendor 104 may be a user 102C within the social network environment 100, or may be a non-user outside the social network environment 100. The social network provider 130 may also be an asset vendor. The asset vendor may be coupled to the social network provider 130 at a user device 110 via the communications network 120. In some embodiments, an asset vendor 104 can communicate directly with the social network provider 130. The social network provider 130 may receive a fee for the connecting the users 102, for example a purchasing user 102A, with the asset vendor 104 and/or for a purchase of an asset. The fee may be received from the user 102A and/or from the asset vendor 104. In some embodiments, the fee is received from an advertiser for advertising attached to an asset purchased and displayed via the social network environment 100. The fee may be any amount, for example based on a percentage of the purchase, a flat rate, a combination of flat rate plus percentage, profit, display time, number of hits, etc.

The social network environment 100 further includes an asset engine 135. The asset engine 135 is configured to track, manipulate, acquire, trade, gift, dispose of, and display various assets, including real assets, digital assets, and virtual assets. The asset engine 135 may acquire assets for the user 102A via the social network provider 130, or may facilitate purchase of an asset on behalf of the user 102A, for transfer to a recipient user 102B as a gift. The asset engine 135 may display an icon representing an asset or the digital asset itself. The icon and/or a digital asset represented by the icon may be displayed on a webpage belonging to the user 102A and made visible to other users 102, for example a user 102C. In some embodiments, the asset engine 135 displays only an asset or an icon representing an asset that has been purchased via the social network provider 130.

Figure 2:
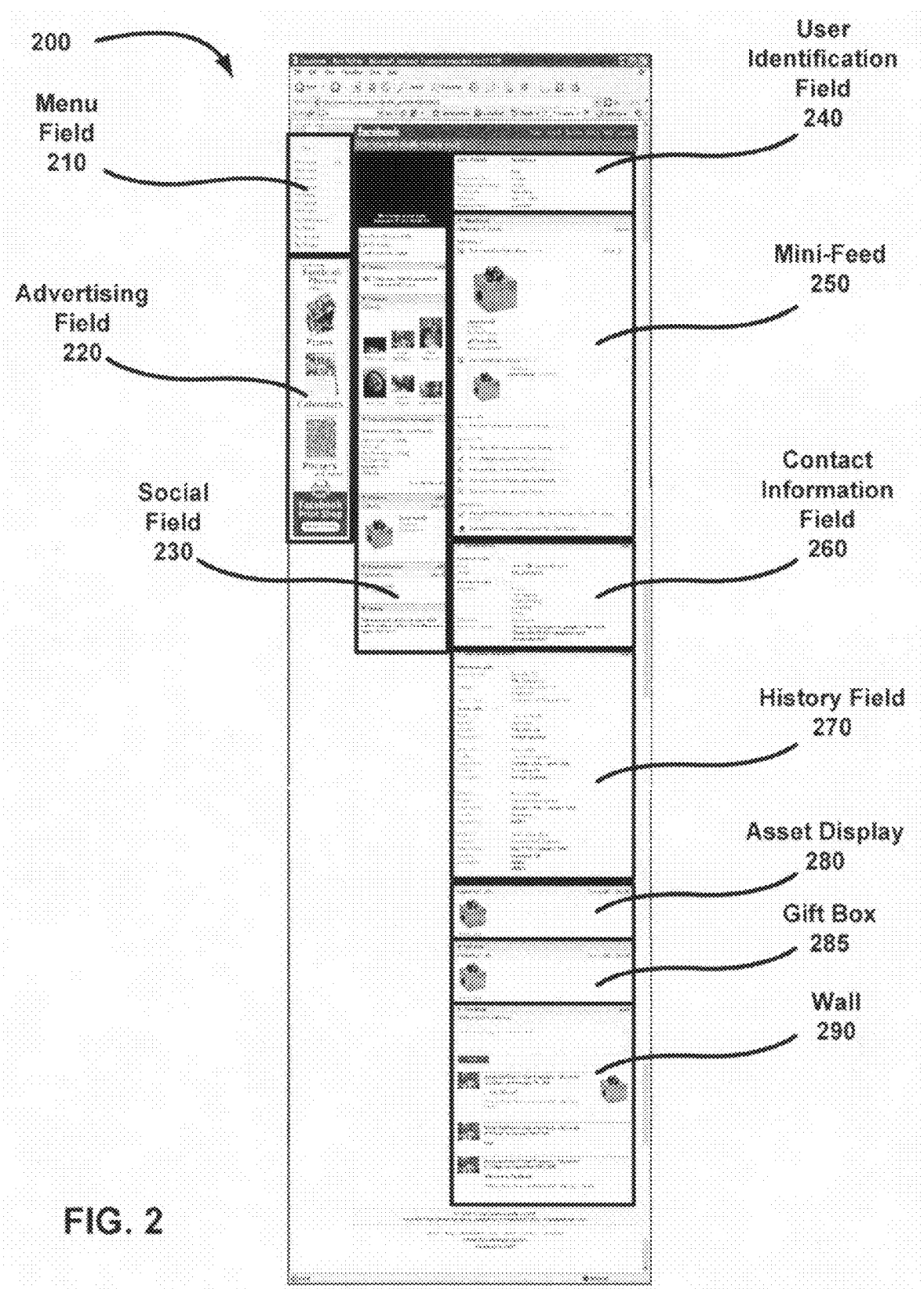
FIG. 2 is a screen shot of an exemplary profile representing a user in the social network environment of FIG. 1.

Referring now to FIG. 2, a screen shot of an exemplary profile 200, representing a user 102 in the social network environment 100 of FIG. 1, is shown. The profile 200 may occupy an entire web page or a portion of a webpage in the social network environment. The profile 200 includes various fields relating to the user 102. Fields in the profile 200 illustrated in FIG. 2 include a menu field 210, an advertising field 220, a social field 230, a user identification field 240, a mini-feed display 250, a contact information field 260, a history field 270, an asset display 280, a gift box 285, and a wall 290. However, fewer or more fields may comprise the profile 200 and still fall within the scope of various embodiments.

As illustrated in FIG. 2, the menu field 210 includes links to various webpages such as links to friends, photos, shares, notes, groups, events, messages, mobile, account, privacy, and/or other webpages. It may be appreciated that additional links may be provided to the user 102 and that some of the links listed in the above example may be omitted. The advertising field 220 provides the social network provider 130 a space to present advertising to the user.

The social field 230 illustrated in FIG. 2 includes an image of the user 102 and information regarding the user 102, such as a status, a list of friends, a list of photo albums posted by the user 102, a list of posts by the user 102, and notes posted by the user 102, as described in U.S. patent application Ser. No. 11/502,757, filed on Aug. 11, 2006, titled "Systems and Methods for Generating Dynamic Relationship-Based Content Personalized for Members of a Web-Based Social Network," and U.S. patent application Ser. No. 11/580,210, filed on Oct. 11, 2006, titled "System and Method for Tagging Digital Media."

The user identification field 240 includes further information regarding the user 102, for example, personal statistics, such as, name, gender, age, interests, etc. The mini-feed display 250 presents short news clips relating to the user 102, such as those described in U.S. patent application Ser. No. 11/503,242, filed on Aug. 11, 2006, titled "System and Method for Dynamically Providing a News Feed About a User of a Social Network." The contact information field 260 includes various contact and personal information such as phone numbers, hobbies, etc. The history field 270 includes information regarding high schools, colleges, universities, attended, as well as companies where the user has worked.

The asset display 280 may display digital assets purchased by a user 102A. Examples of digital assets displayed in the digital asset display 280 include, images animations, video clips, etc. Information regarding the digital assets, such as the asset vendor 104, date of purchase, etc., may be posted with the digital asset in the asset display 280. Optionally, the asset display 280 includes icons that provide links to other webpages, for example a gift webpage or a webpage for the user 102A.

The gift box 285 may display digital assets received as gifts by a recipient user 102B from a user 102A. In some embodiments, the identity of the user 102A, and/or a message from the user 102A may be posted in the gift box with the gift. Optionally, the gift box 285 includes icons that provide links to other webpages.

The wall 290 displays information and comments posted to the profile 200 by various users 102. An icon representing a gift received from a user 102A may be posted to the wall 290 along with comments or messages from the user 102A. In some embodiments the icon posted wall 290 may represent a digital gift appearing in the gift box 285.

The profile 200 depicted in FIG. 2 has been assembled from a composite of several screen shots for illustration purposes. In general use, a user 102 may scroll up or down to view various portions of the profile webpage. In some embodiments, the entries described in one field may instead be found in another field. For example, an entry described as being displayed in the wall 290 may be found instead in the social field 230. Some entries may be found in more than one field. For example, an icon of a gift may be found in an entry in a mini-feed display 250, the wall 290, and the social field 230. Some entries illustrated in FIG. 2 may be omitted and/or additional entries may be included.

Figure 3:
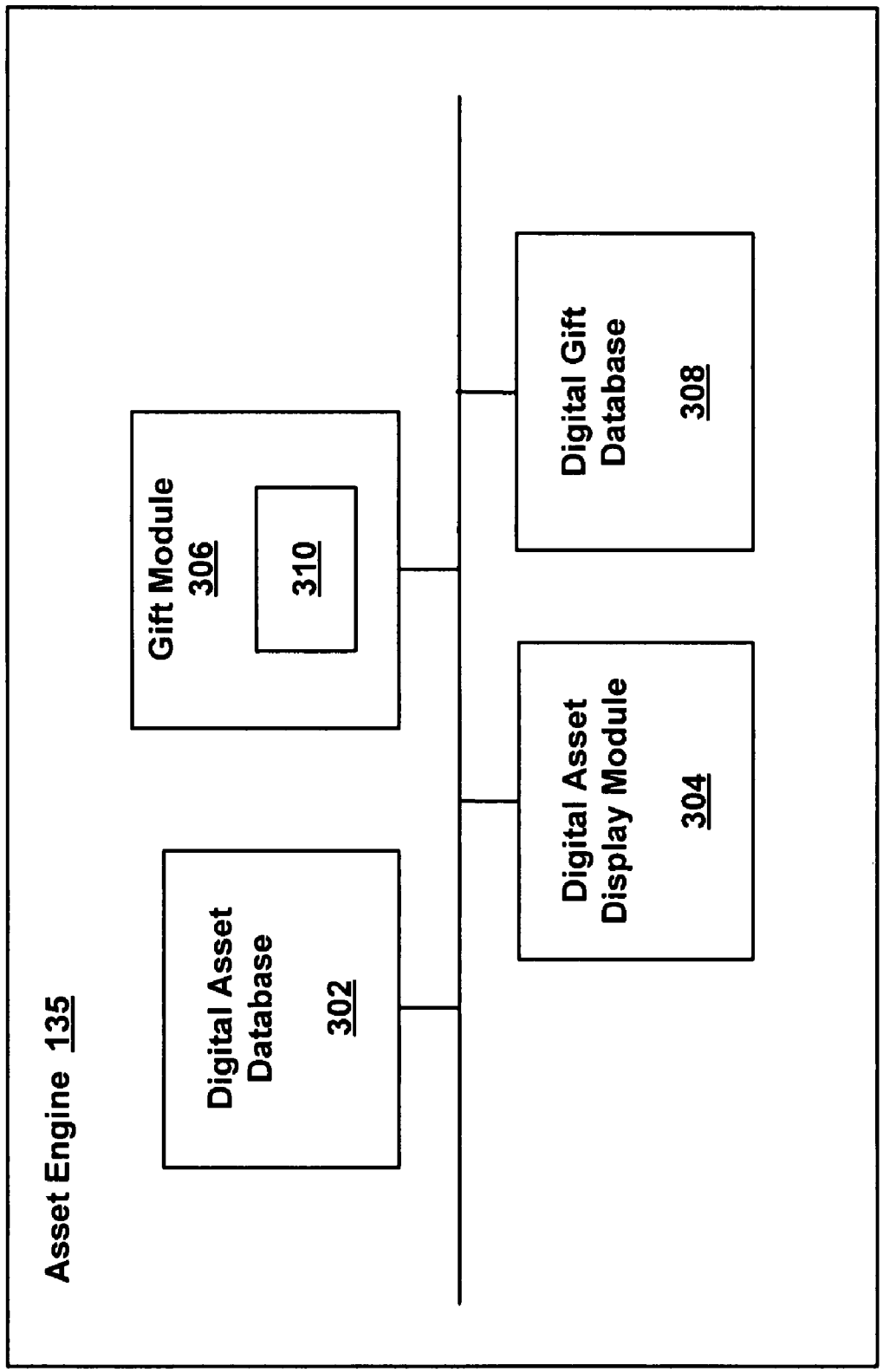
FIG. 3 is a block diagram of an exemplary asset display engine of social network environment of FIG. 1.

FIG. 3 is a block diagram of an exemplary asset engine 135. The asset engine 135 is configured to provide the user 102 with services for acquiring an asset, giving an asset as a gift, receiving a gift, and displaying an icon representing the asset within the social network environment 100. The asset engine 135 includes a digital asset database 302, display module 304, a gift module 306, and a digital gift database 308.

The digital asset database 302 is configured to store a digital asset and/or information about the digital asset for a user 102 who owns the digital asset, for example a user 102A who purchased the digital asset. Information about the digital asset may include an associated icon for representing the digital asset, sharing privileges, access privileges, the number of times the digital asset has been accessed by other users 102C, the number of other users 102C who have accessed the digital asset, etc. An example of stored access privileges includes a list of individuals, groups, networks, and so forth, which have been granted access by the user 102A. In some embodiments, the user 102A can select an icon to assign to a selected digital asset, using the digital asset database 302. The digital asset database 302 may store information indicating that the asset was purchased via the social network provider, the identity of the asset vendor 104, the cost, the date of purchase, etc. Alternatively, when a recipient user 102B receives a digital asset as a gift from a user 102A, the digital asset database 302 may store the identity of the user 102A, date received, etc. The digital asset database 302 may store one or more digital assets and/or information about the one or more digital assets.

In some embodiments, the digital asset database 302 may be consulted to verify that a user 102A purchased a particular digital asset via the social network environment 100 and therefore owns, or did own, that particular digital asset. Similarly, the digital asset database 302 may be consulted to verify that a recipient user 102B received a particular digital asset as a gift from a user 102A and therefore owns, or did own, that particular digital asset. In some embodiments, only digital assets which can be verified as having been acquired via the social network environment 100 are displayed. Thus, an icon can represent a verified digital asset and serve as an indicator to other users 102C that the user 102A owns or did own the digital asset.

The display module 304 is configured to display digital assets and/or icons representing assets that are in the digital asset database 302. The display module 304 may display icons representing assets acquired from purchases, trades, uploads and/or downloads, as gifts, etc. The display module 304 may display the icons and/or digital assets on a webpage belonging to the user 102, for example, the profile 200. In some embodiments, only an icon or associated digital asset that has been purchased via the social network environment 100, whether received in trade from another user 102C, or received as a gift from another user 102A, is displayed by the display module 304.

The display module 304 may display a gift in a region of the profile 200 reserved for displaying gifts, for example the gift box 285. The display module 304 may display a purchased digital asset in a region of the profile 200 reserved for displaying purchases, for example the asset display 280. Alternately, the display module 304 may display one or more digital assets in one or more separate webpages reserved for displaying gifts and/or purchases.

The display module 304 may display an icon representing purchases and/or gifts in various fields of the profile 200, including the social field 230, the mini feed display 250, the wall 290, etc. The display of icons representing gifts may be subject to privacy settings. In some embodiments, the display module 304 may display icons in a separate webpage.

The digital gift database 308 includes a table that has information regarding digital assets available as gifts via the social network provider 130. In one embodiment, the table includes rows, each containing entries corresponding to gift information, for example, a gift ID, and a file name of a stored digital asset, such as a digital image. The gift module 306 is configured to transfer a gift from a user 102A to a recipient user 102B. The gift may be a real asset, a digital asset, and/or a virtual asset. In some embodiments, the user 102A provides the identity of the recipient user 102B to the gift module 306 and selects a gift for the recipient user 102B. For example the user 102A may wish to give an image of a rose (a digital asset) to the recipient user 102B as a Valentine's Day gift. The gift module 306 may recommend several rose images to the user 102A for consideration. In some embodiments, the recommendations are based on an affinity of the recipient user 102B. See, e.g., U.S. patent application Ser. No. 11/503,093, filed on Aug. 11, 2006, titled "Systems and Methods for Measuring User Affinity in a Social Network Environment." In some embodiments, the gift module 306 includes a given gift database 310. The given gift database 310 can store information about gifts that are given by a user 102A to a recipient user 102B. Examples of stored information include the gift ID, the SKU of the gift, the identity of the user 102A giving the gift, the identity of the recipient user 102B, a message that has been attached to the gift, and so forth. When the gift is a digital asset, the digital asset display module 304 can cross reference information in the given gift database 310 with entries in the digital gift database 308 to determine the filename of the file containing the digital image and display the image on the profile webpage 200 of the recipient user 102B.

Alternatively, the user 102A may browse a gift store webpage or bid in an auction within the social network environment 100 for the asset. Once the user 102A selects and purchases an image, for example, of a rose, the gift module 306 transfers the image to the digital asset database 302 of the recipient user 102B, and the display module 304 displays the rose. In some embodiments, the user 102A may provide text (for example, a greeting, a message, etc) to the gift module 306 to be attached to the image of the rose. The gift module 306 may also transfer an icon of the rose to the digital asset database 302, and the display module 304 may display the icon of the rose. In some embodiments, the gift module 306 may provide information regarding the gift to a news feed or a mini-feed. See, e.g., U.S. patent application Ser. No. 11/503,242, filed on Aug. 11, 2006, titled "System and Method for Dynamically Providing a News Feed About a User of a Social Network."

Alternatively, the user 102A may give a real asset instead of a digital asset, for example, a bouquet of one dozen roses. The gift module 306 may transfer an icon representing a selected bouquet to the digital asset database 302 of the recipient user 102B and the display module 304 may display the icon for various other users 102C to view. The recipient user 102B and other users 102C may click on the icon to view information about the gift such as the identity of the user 102A who gave the gift, the type of gift, images, delivery date, the event for which the gift was given, etc. The gift module 306 may provide such information to a mini-feed display 250. The gift module may also participate in purchasing the roses from an asset vendor 104 and in arranging for delivery to the recipient user 102B.

In some embodiments, the user 102A may choose to give a virtual asset to the recipient user 102B. The gift module 306 may transfer the virtual asset and an icon representing virtual asset to the digital asset database 302 of the recipient user 102B and the display module 304 may display the icon on the recipient user's 102B webpage as well as provide information regarding the gift to a news feed or mini-feed.

In further embodiments, the social network provider 130 may give gifts using the gift module 306 to a recipient user 102B according to arbitrary rules. For example, the recipient user 102B may receive a gift from the social network provider 130 for watching a movie trailer. Similarly, an asset vendor 104 may give gifts via the social network provider 130, using the gift module 306, to a recipient user 102B, for example to introduce user to a service or promote a product.

The gift module 306 is further configured to accept or reject gifts. For example, the gift module 306 may notify the recipient user 102B of a digital asset gift. If the recipient user 102B accepts the gift, the gift module 306 may update the digital asset database 302, and/or the given gift database 310. Alternatively, the gift module 306 may automatically accept the gift and then later delete the gift in response to a request from the recipient user 102B to reject the gift. In some embodiments, deleting the gift includes removing entries regarding the gift from the digital asset database 302, and/or the given gift database 310.

Alternatively, the recipient user 102B may reject the gift, or the gift module 306 may be configured to reject the gift automatically. For example the gift module 306 may be configured to automatically reject a gift from a user 102A who is not a "friend" of the recipient user 102B. Upon rejection, the gift module 306 may remove the gift and update the digital asset database 302. When the rejected gift is a real asset, the gift module 306 may cancel shipment or arrange for return of the gift to the user 102A or the asset vendor 104.

In some embodiments, a digital gift expires after a predetermined time and the gift module 306 is configured to remove the expired digital gift from the digital asset database 302. The gift module 306 may similarly be configured to remove an expired icon or virtual gift from the digital asset database 302.

Although the asset engine 135 is described as being comprised of various components (e.g., the digital asset database 302, the display module 304, and the gift module 306), fewer or more components may comprise the asset engine 135 and still fall within the scope of various embodiments.

Figure 4:
FIG. 4 is an exemplary screen shot of a gift status window.

FIG. 4 is an exemplary screen shot of a gift status window 400. The gift status window 400 includes a gift type window 410 and a "Give" button 420. The gift type window 410 indicates gifts of a particular type. Types may be grouped by price, occasion, gender, age, etc. Multiple gifts of a particular type may be purchased by a user 102 at one time and given later. For simplicity, the same price may be applied to all the gifts. The gift type window 410 illustrated in FIG. 4 indicates "Valentine's Day Gifts" and that one gift is available for the user 102 to give to another user 102. The "Give" button 420 provides a link to a section of a gift store that includes the selected gift type, i.e. "Valentine's Day Gifts." The gift status window 400 further includes a user icon 430 including an image of a user 102A who intends to give a gift to a recipient user 102B. The gift status window 400 further includes a free gift status 440 indicating that the user represented by the user icon 430 has a free gift available to give and a link 445 labeled "Give it" configured link to a webpage for giving without charge to the user 102A. Although the gift status window 400 is described as being comprised of various components, fewer or more components may comprise the gift status window 400 and still fall within the scope of various embodiments.

Figure 5:
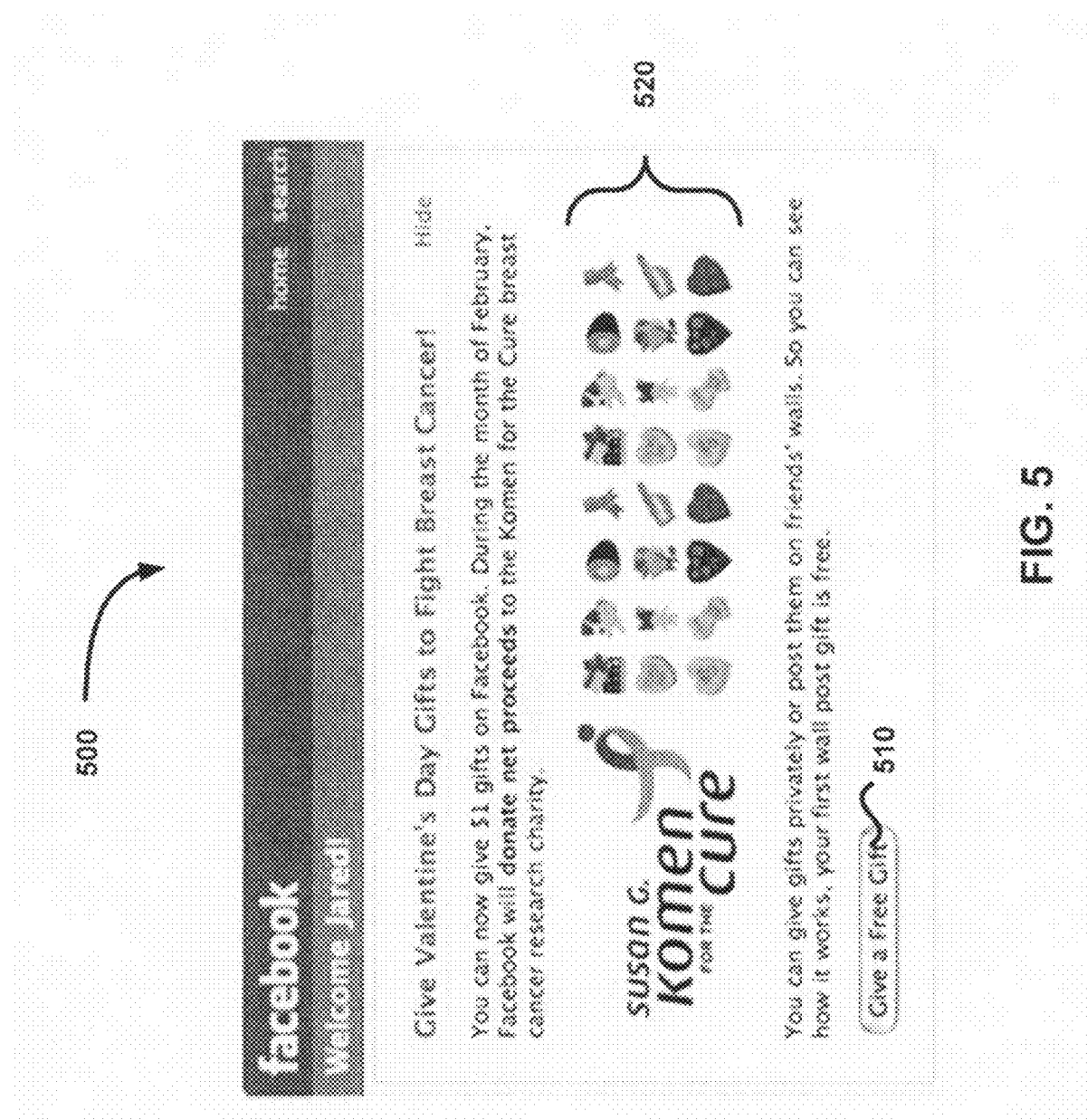
FIG. 5 is an exemplary screen shot of a gift store window for a vendor.

FIG. 5 is an exemplary screen shot of a gift store window 500 for an asset vendor 104. The gift store window 500 includes a button 510 and a thumbnail display 520. The thumbnail display 520 includes an array of icons representing various gifts available in the gift store. The icons in the thumbnail display 520 may include links to a gift store selection window. Alternatively, the thumbnail display 520 may display a sample set of icons of gifts available in the asset vendor's 104 gift store. In some embodiments, the thumbnail display 520 may display a set of gifts from a variety of asset vendors 104. The button 510 includes a hyperlink to another window. In some embodiments, an asset vendor 104 may pay a fee to the social network provider 130 for placement of a thumbnail in the thumbnail display 520 of the gift store window 500. Although the gift store window 500 is described as being comprised of various components, fewer or more components may comprise the gift store window 500 and still fall within the scope of various embodiments.

Figure 6:
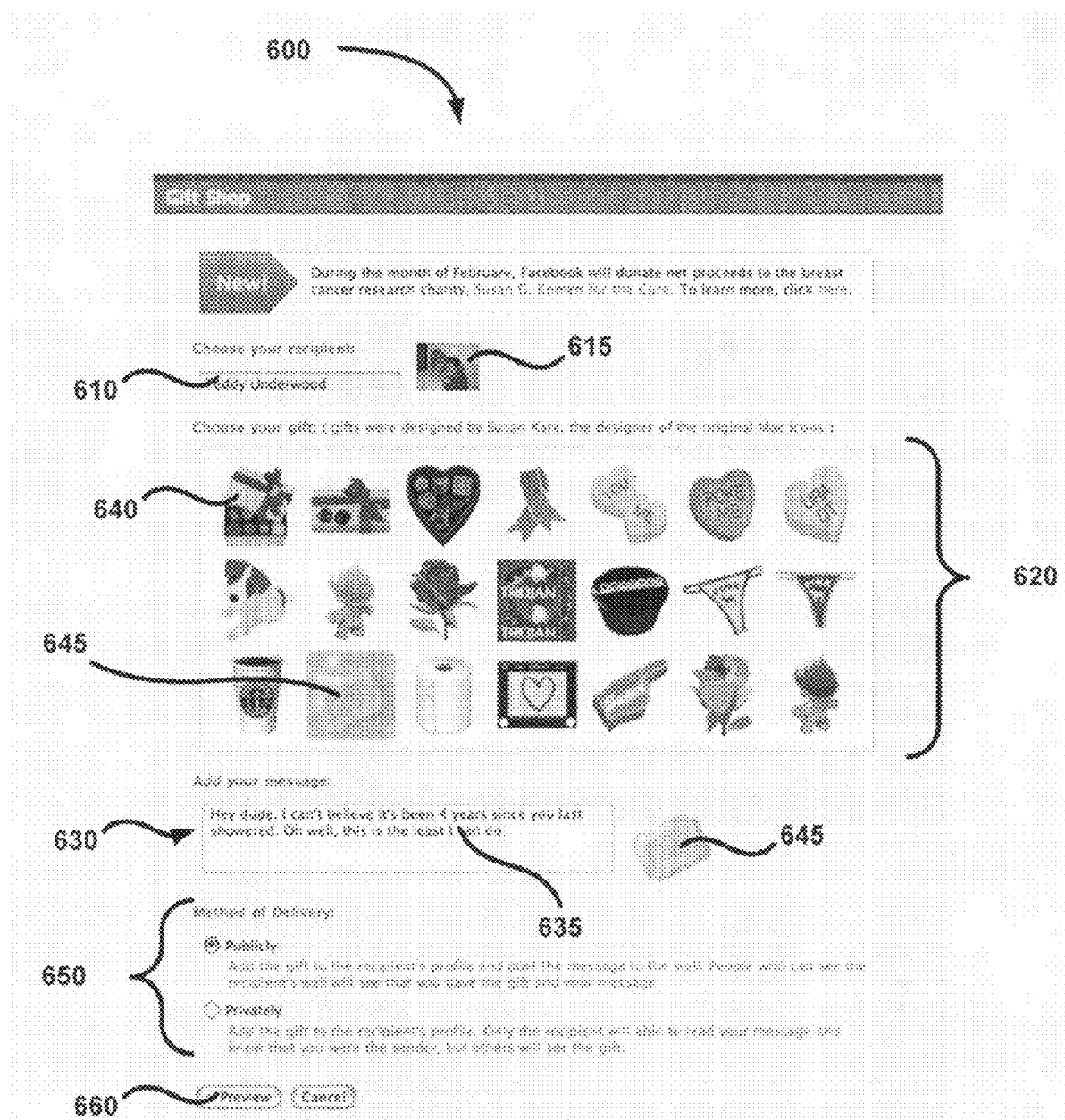
FIG. 6 is an exemplary screen shot of a gift shop display window.

FIG. 6 is an exemplary screen shot of a gift shop display window 600. The gift shop display window 600 includes a recipient window 610, a gift display window 620, and a message window 630. The recipient window 610 is configured to receive an identity of a recipient user 102B. The user 102A enters a name of the recipient user 102B and the gift module 306 verifies the recipient user 102B as a member of the social network environment 100. The gift module 306 may display an icon of the recipient user's 102B image in an image window 615.

The gift shop display window 600 further includes images of an assortment of gifts 640 in the gift display window 620. As illustrated here, a gift 645 is displayed next to the message window 630 and is also highlighted in the gift display window 620, indicating that the gift 645 has been selected. The gift 645 illustrated in this particular example is a digital asset. However, in some embodiments, the gift display window 620 may display icons representing gifts that are real assets, such an IPOD, or virtual gifts, such as a movie pass. The message window 630 is configured to receive a text message 635 to attach to the gift 645. The gift shop display window 600 also includes privacy buttons 650. The privacy buttons 650 are configured to permit the user 102A to select a method for delivery of the gift 645, i.e., "Publicly" or "Privately." For example, when the gift 645 is delivered "Publicly" the gift may be added to a profile 200 belonging to the recipient user 102B, and the text message 635 in the message window 630 may be posted to the wall 290 in the profile 200 for other users 102C to read. Alternatively, when the gift 645 is delivered "Privately" to the profile 200 for the recipient user 102B, the text message 635 in the message window 630 may be visible only to the recipient user 102B. In various embodiments, additional privacy buttons 650 may lead to withholding the name of the user 102A giving the gift, hiding the gift 645 from all but the recipient user 102B, etc. For example, the privacy buttons 650 include an "anonymously" button (not illustrated) which gives the user 102A an additional option to give the gift 645 to the recipient user 102B anonymously.

Figure 7:
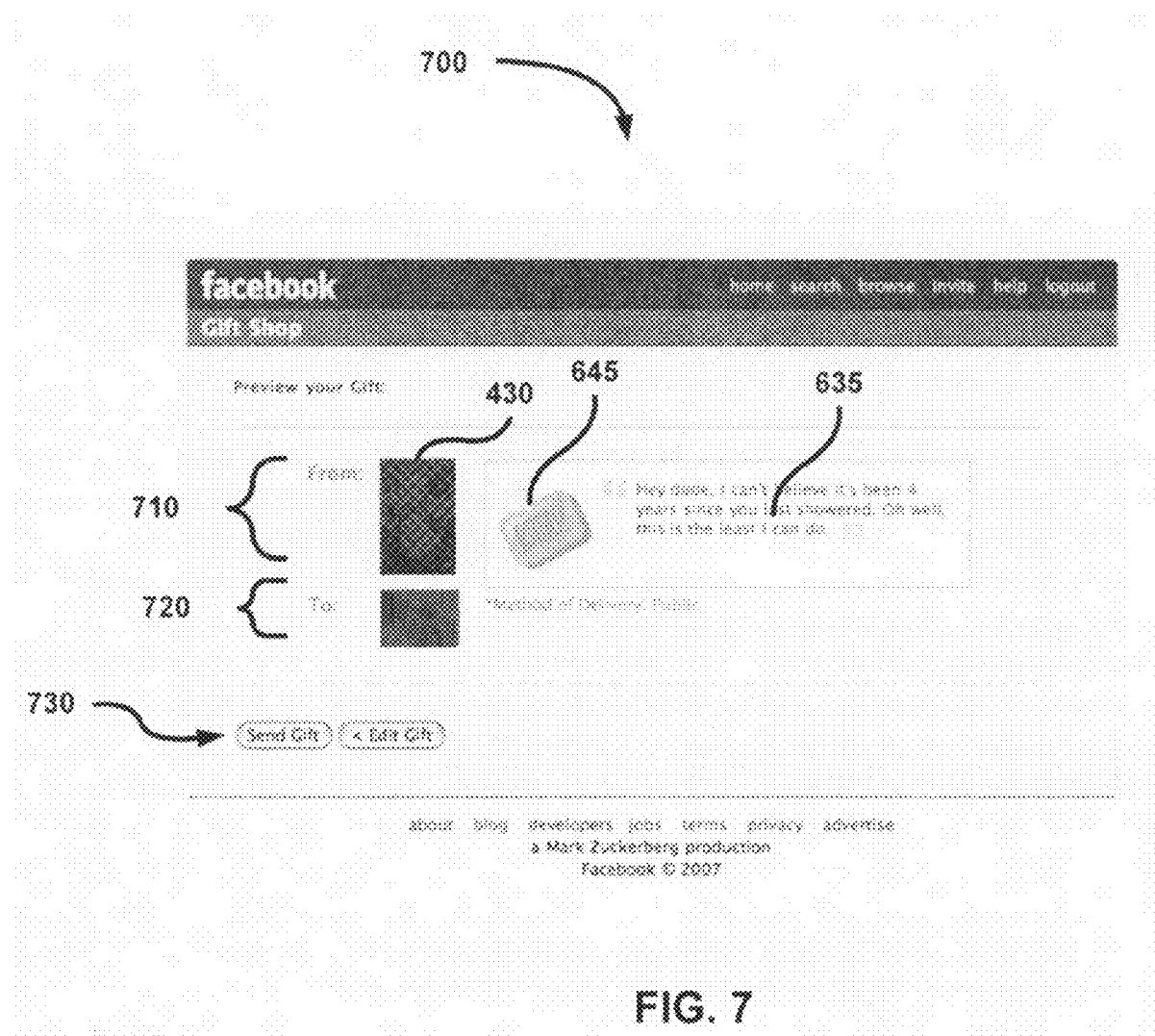
FIG. 7 is an exemplary screen shot of a gift preview window.

The gift shop display window 600 further includes a "Preview" button 660. The "Preview" button 660 may include a link to a gift preview window, such as is shown in FIG. 7. Although the gift shop display window 600 is described as being comprised of various components, fewer or more components may comprise the gift shop display window 600 and still fall within the scope of various embodiments.

FIG. 7 is an exemplary screen shot of a gift preview window 700. The gift preview window 700 includes a "From" window 710, a "To" window 720 and decision buttons 730. The "From" window 710 displays the gift 645 and the attached text message 635, as selected and entered in the gift shop display window 600, in FIG. 6. The "From" window 710 may include the user icon 430 comprising an image of the user 102A who is giving the gift. The "To" window 720 displays an image of the recipient user 102B, thus providing visual verification of the recipient user 102B. The "To" window 720 includes an indication of the method of delivery, such as "Public" or "Private," as selected in the gift shop display window 600, in FIG. 6. The "To" window 720 and "From" window 710 may include additional or less information.

The decision buttons 730 include various selections such as a "Send Gift" button or an "Edit Gift" button allowing the user 102A to send the gift or edit the gift selection, respectively. The decision buttons 730 may include other buttons, such as a "Cancel" button, etc. If the user 102A is satisfied with contents of the gift preview window 700, the "Send Gift" button may be selected from the decision buttons 730. If the gift is a "Free Gift" or has been paid for, the gift module 306 may deliver the gift to the recipient user 102B. Otherwise, the gift module 306 may present the user 102A with a payment window. Although the gift preview window 700 is described as being comprised of various components, fewer or more components may comprise the gift preview window 700 and still fall within the scope of various embodiments.

Figure 8:
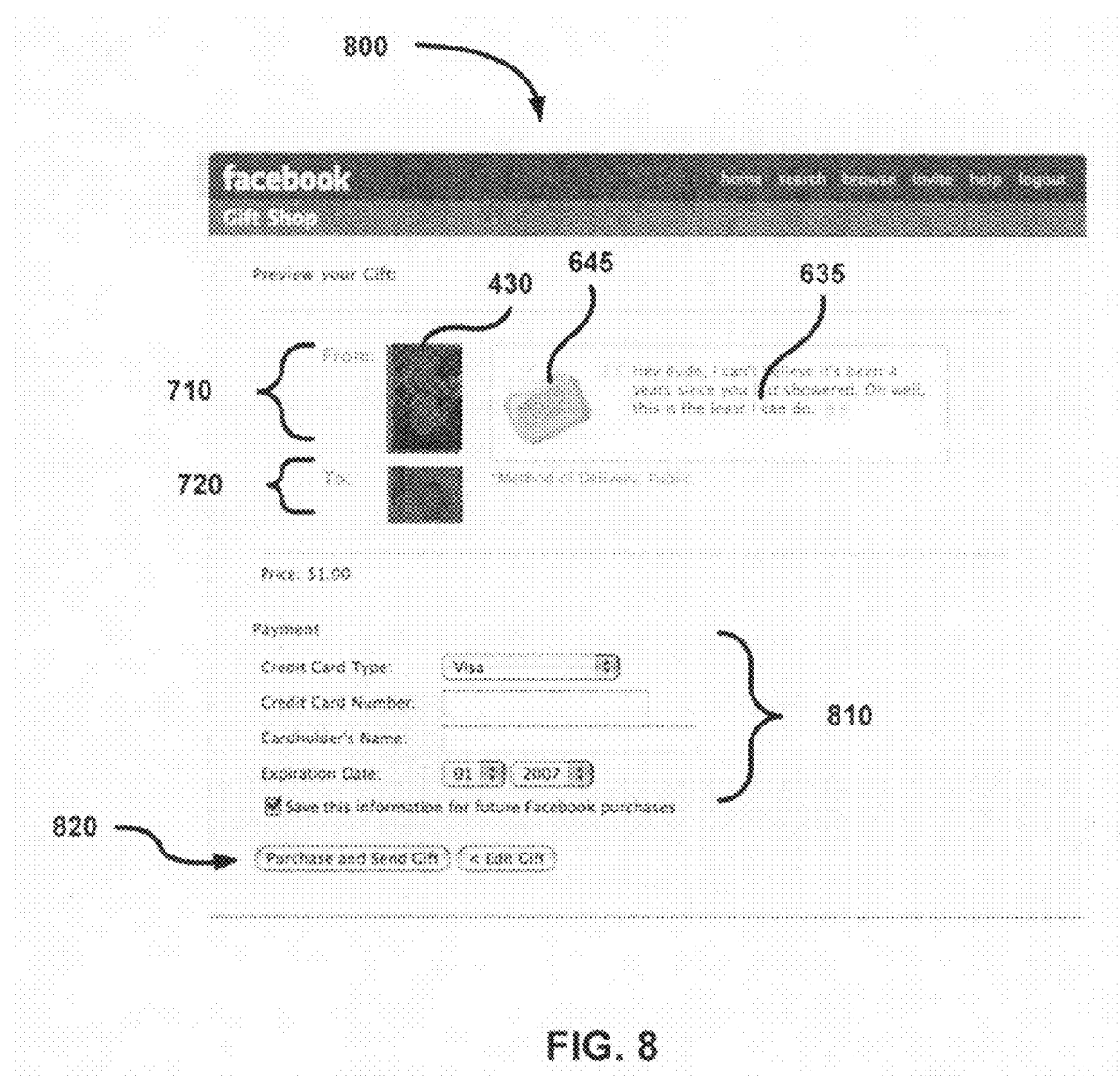
FIG. 8 is an exemplary screen shot of a payment window.

FIG. 8 is an exemplary screen shot of a payment window 800. The payment window 800 includes the "From" window 710 and the "To" window 720 of the gift preview window 700 in FIG. 7, plus a payment field 810 and decision buttons 820. The payment field 810 is configured to receive payment information, for example, credit card type, credit card number, card holder's name, expiration date, etc. In various embodiments, the payment field 810 may receive checking account information, debit card information, savings account information, payment services information, etc.

The decision buttons 820 may include selections that enable the user 102A to "Purchase and Send Gift" or "Edit Gift." If the user 102 is satisfied with contents of the payment window 800, the "Purchase and Send Gift" button may be selected from the decision buttons 820. Alternatively, the user 102 may select the "Edit Gift" button and the gift module 306 may return the user 102 to the gift shop display window 600. The decision buttons 820 may include additional or other selections. Although the payment window 800 is described as being comprised of various components, fewer or more components may comprise the payment window 800 and still fall within the scope of various embodiments.

Figure 9:
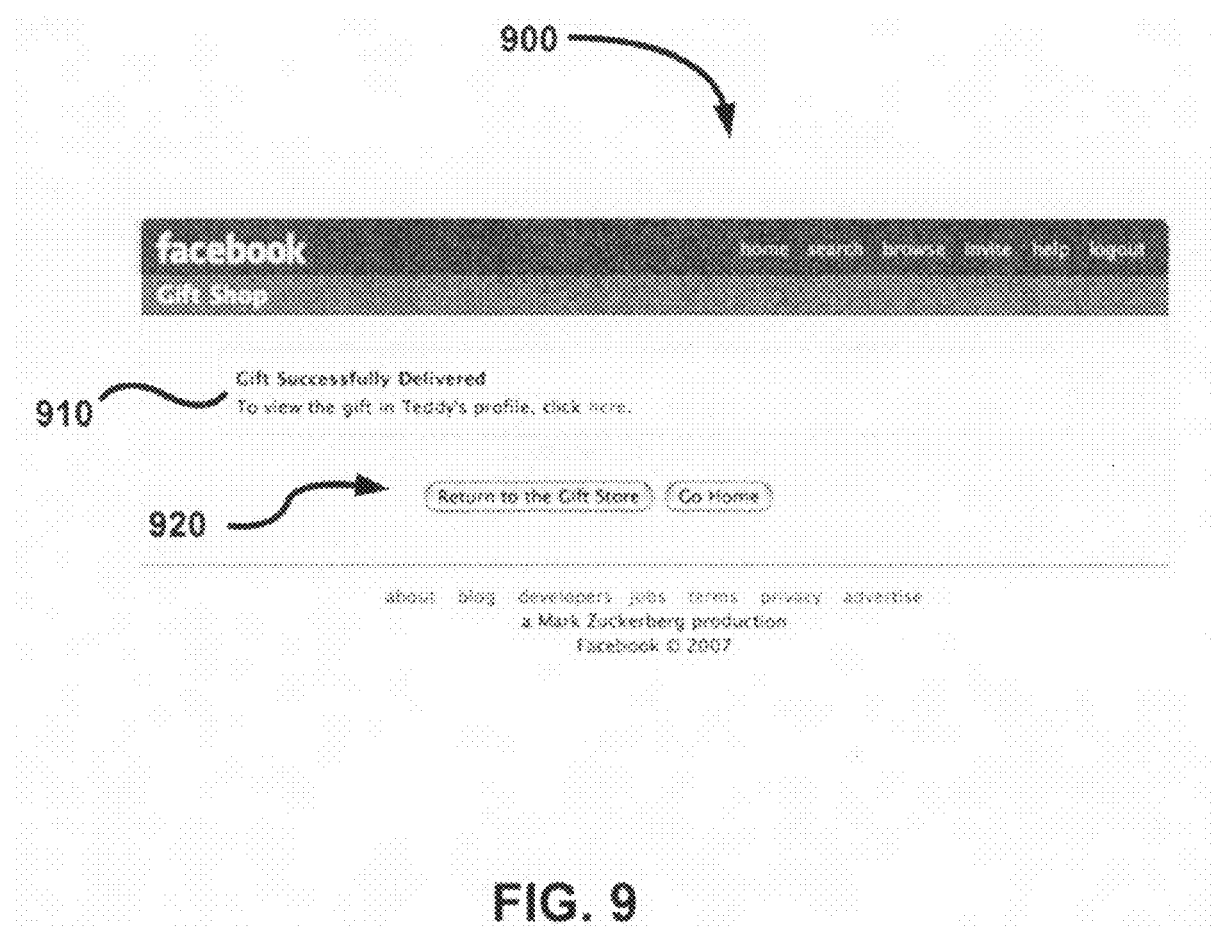
FIG. 9 is an exemplary screen shot of a confirmation window.

FIG. 9 is an exemplary screen shot of a confirmation window 900 indicating delivery of a gift to the recipient user 102B. The confirmation window 900 includes a confirmation field 910 and decision buttons 920. The confirmation field 910 may include a message confirming delivery to the recipient user 102B. The confirmation field 910 may also include a link to the profile of the recipient user 102B, linking the user 102A directly to the profile to view the delivered gift. The decision buttons 920 provide the user 102A a link to the gift store window 500 or an option to "Go Home." Although the confirmation window 900 is described as being comprised of various components, fewer or more components may comprise the confirmation window 900 and still fall within the scope of various embodiments.

Figure 10:
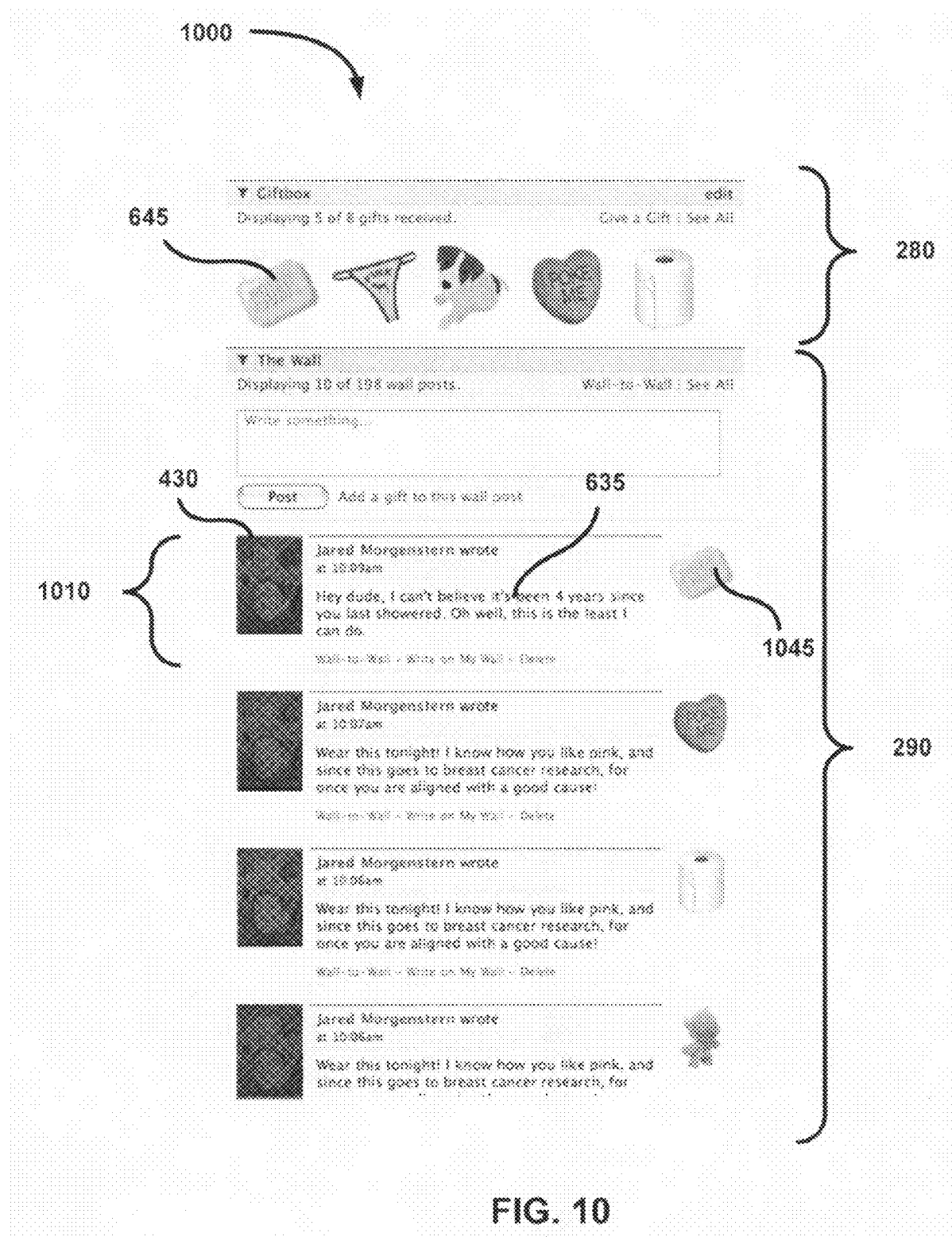
FIG. 10 is an exemplary screen shot of a portion of the profile of FIG. 2 illustrating a gift box window for displaying a gift.

FIG. 10 is an exemplary screen shot of a portion 1000 of a profile 200 including a gift box 285 and a wall 290. The display module 304 may display gifts received by the recipient user 102B in the gift box 285. For example, the gift 645 is shown in the gift box 285 of FIG. 10. The display module 304 may display multiple gifts in the gift box 285.

The wall 290 may include a post 1010 indicating a received gift. The post 1010 may include the user icon 430 and the text message 635 accompanying the gift 645. The display module 304 may further display a gift icon 1045 representing the gift 645 in the post 1010. The wall 290 may include multiple posts 1010 or no posts 1010. The posts 1010 may include items other than gifts. Although the portion 1000 of the profile 200 is described as being comprised of various components, fewer or more components may comprise the portion 1000 of the profile 200 and still fall within the scope of various embodiments.

Figure 11:
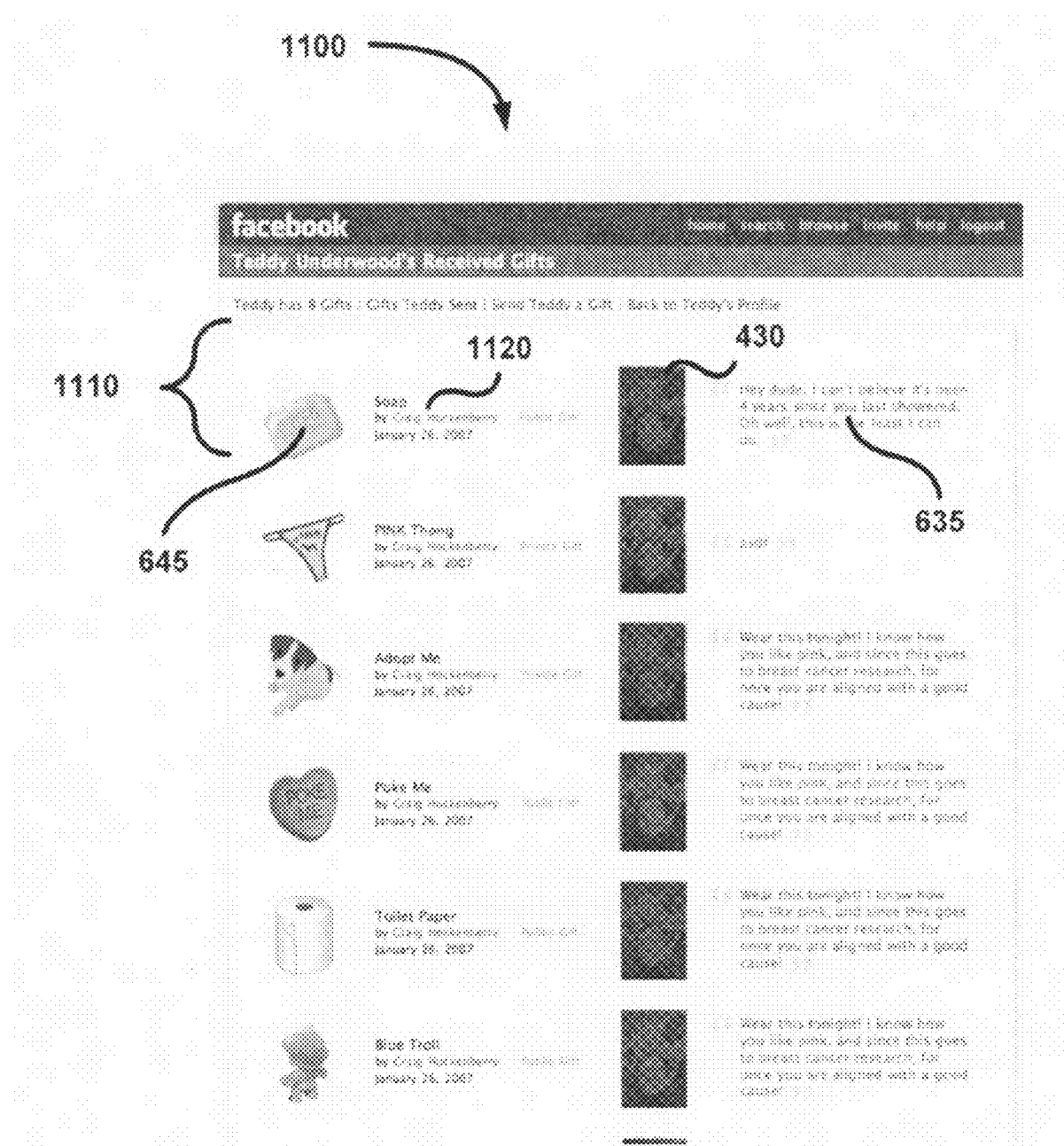
FIG. 11 is an exemplary screen shot of a received gift webpage.

FIG. 11 is an exemplary screen shot of a received gift webpage 1100. The received gift window may be reached via a link in the menu field 210 in the profile 200. The received gift webpage 1100 includes one or more gift entries, for example gift entry 1110. The display module 304 may display a gift, for example, the gift 645 in the gift entry 1110. In various embodiments, the gift entry 1110 further includes a user icon 430, a text message 635 accompanying the gift 645, and/or gift information 1120. The gift information may include information about the gift, e.g., the date the gift was received, the designer of the gift, the title of the gift, etc. The received gift webpage 1100 can include multiple gift entries 1110 or no gift entries 1110. Although the received gift webpage 1100 is described as being comprised of various components, fewer or more components may comprise the received gift webpage 1100 and still fall within the scope of various embodiments.

Figure 12:
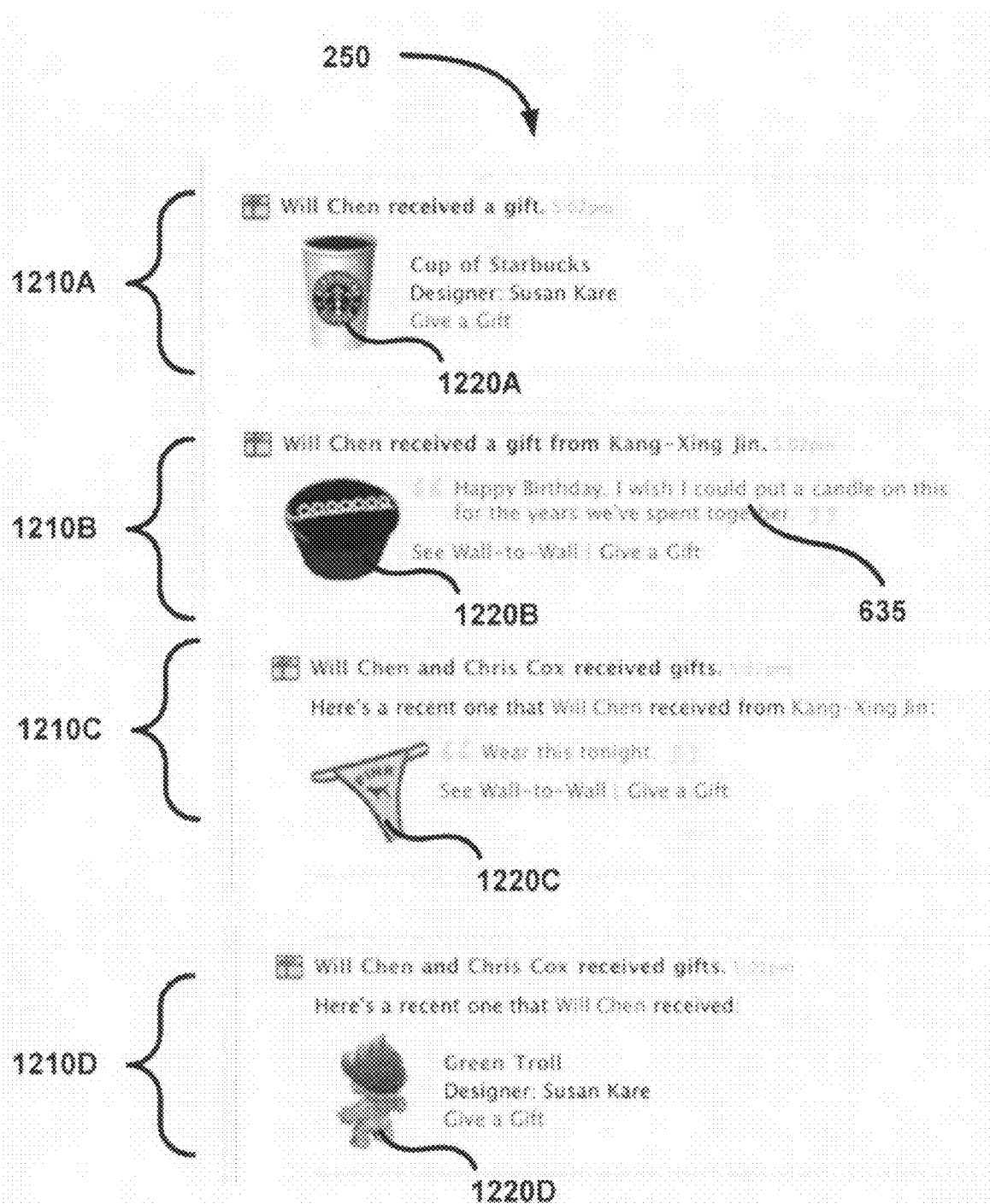
FIG. 12 is an exemplary screen shot of a portion of the profile of FIG. 2 illustrating a mini-feed display.

FIG. 12 is an exemplary screen shot of a mini-feed display 250 from the profile 200 for a recipient user 102B. The mini-feed display 250 includes news items 1210. The mini-feed display 250 as illustrated in FIG. 12 includes four news items 1210, namely news items 1210A-1210D. The mini-feed display 250 may include additional news items 1210 or no news items 1210. The display module 304 may display icons 1220, namely icons 1220A-1220D representing gifts, in the news items 1210A-1210D, respectively. Alternatively, the display module 304 may display digital assets (not illustrated) instead of the icons 1220. The news items 1210 in the mini-feed display 250 may include news about subjects other than gifts. The digital asset display may further display a text message 635 accompanying the icon 1220B, as shown in the news item 1210B. In some embodiments, the user 102A and/or the recipient user 102B may elect to suppress display of the accompanying text message 635 from the news item 1210, as shown in news item 1210A. Although the mini-feed display 250 is described as being comprised of various components, fewer or more components may comprise the mini-feed display 250 and still fall within the scope of various embodiments.

Figure 13:
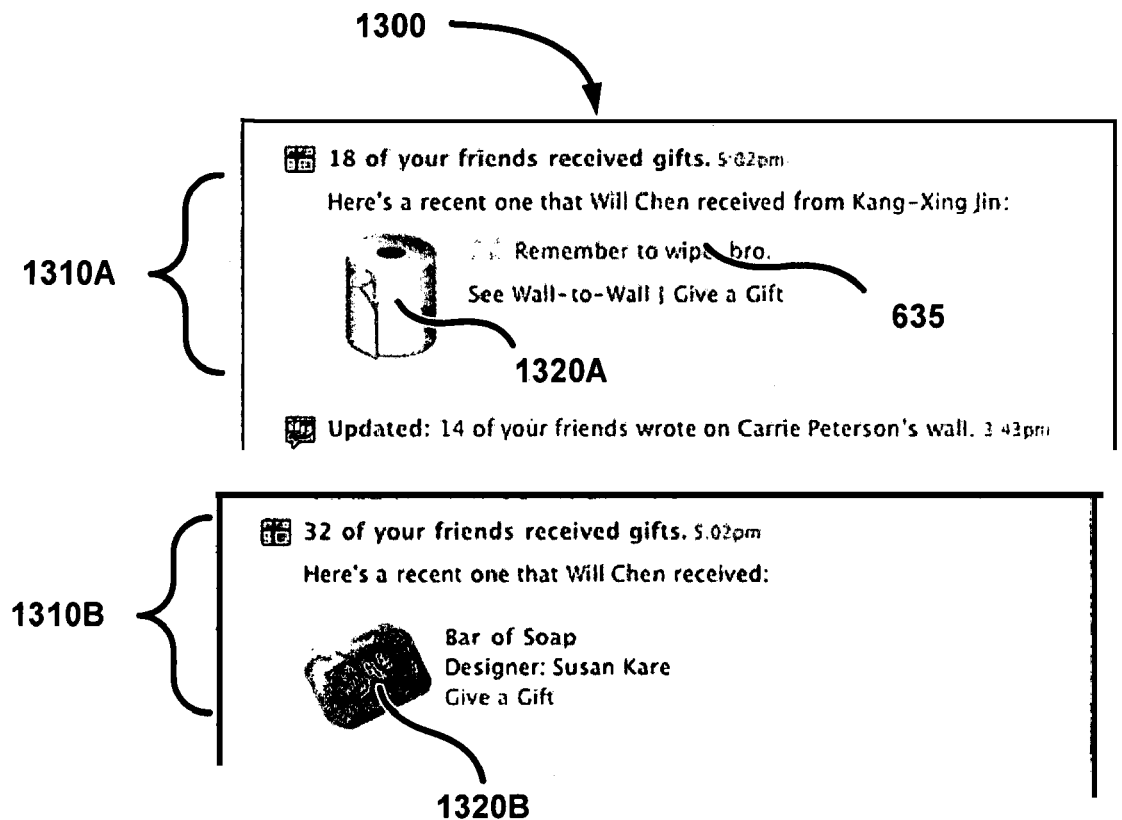
FIG. 13 is an exemplary screen shot of a news feed display.

FIG. 13 is an exemplary screen shot of a news feed display 1300 for a recipient user 102B. The news feed display 1300 includes news items 1310. The news feed display as illustrated in FIG. 13 includes two news items 1310, namely news items 1310A and 1310B, and two icons representing gifts, namely icons 1320A and 1320B, respectively. The news feed display 1300 may include additional news items 1310 or no news items 1310. In various embodiments, the news feed display 1300 can be a portion of a home page, or another webpage. Although the news feed display 1300 is described as being comprised of various components, fewer or more components may comprise the news feed display 1300 and still fall within the scope of various embodiments.

Figure 14:
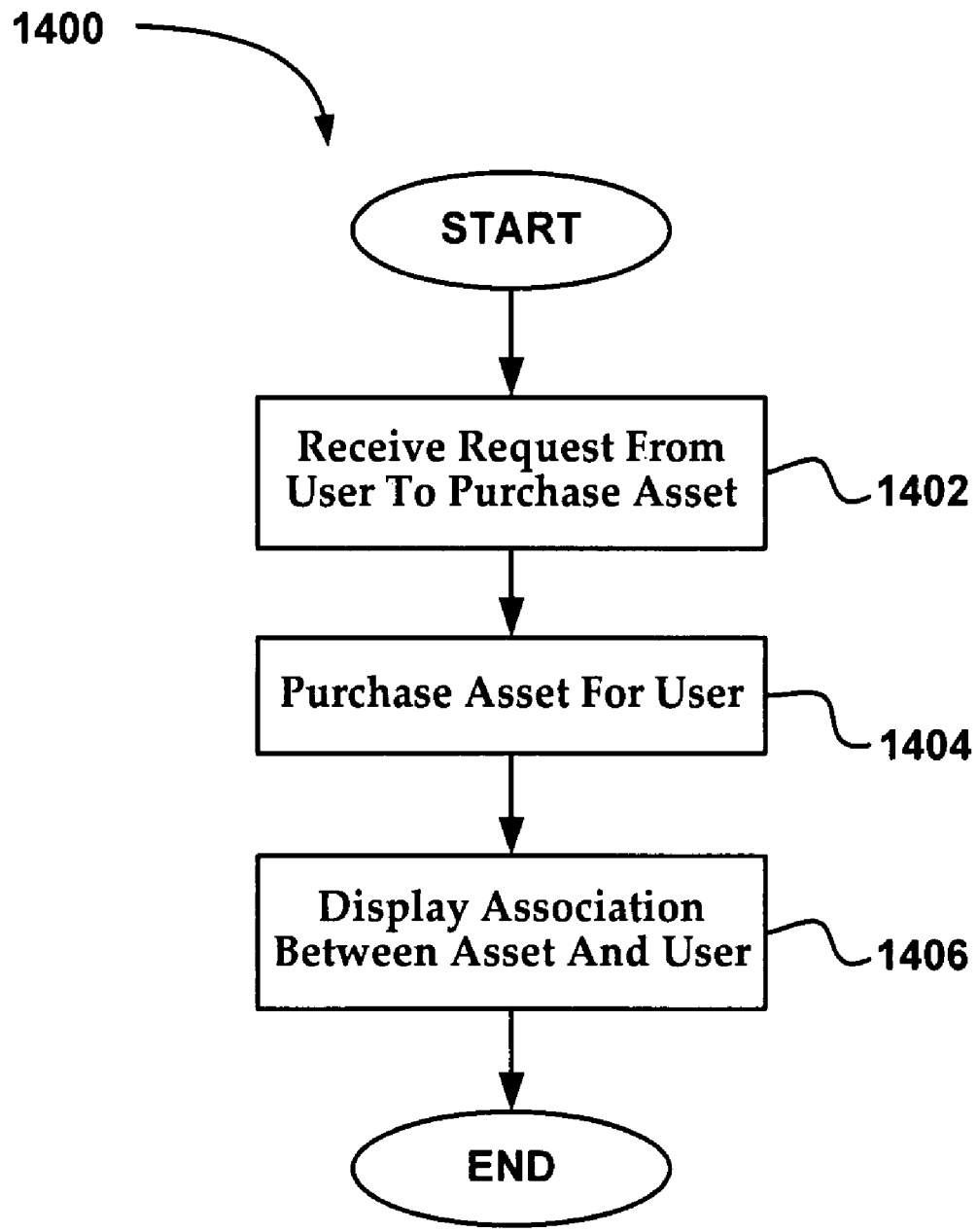
FIG. 14 is a flowchart of an exemplary process for representing an asset in the social network environment of FIG. 1.

FIG. 14 is a flowchart of an exemplary process 1400 for purchasing and displaying an asset in a social network environment 100.

In step 1402, the social network provider 130 receives a request from a user 102A to purchase the asset.

In step 1404, the social network provider 130 purchases the asset on behalf of the user 102A. In some embodiments, purchasing the asset includes receiving money from the user 102A and paying a vendor, for example, an asset vendor 104 for the asset. Alternatively, the user 102A may pay the asset vendor 104 directly. The social network provider 130 may transfer the asset from the asset vendor 104 to the user 102A. For example the social network provider 130 may receive a digital asset from the asset vendor 104 and provide the digital asset to the user 102A via the social network environment 100, as discussed above. Alternatively, the social network provider 130 may direct the asset vendor 104 to ship a real asset to the user 102A.

In step 1406, the asset engine 135 displays an association between the asset and the user 102A. An icon displayed on a webpage belonging to user 102A may represent the association between the asset and the user 102A. When a digital asset is purchased, the digital asset may be displayed. Alternatively, both a digital asset and the associated icon may be displayed in connection with the user 102A, as illustrated in FIG. 10.

Figure 15:
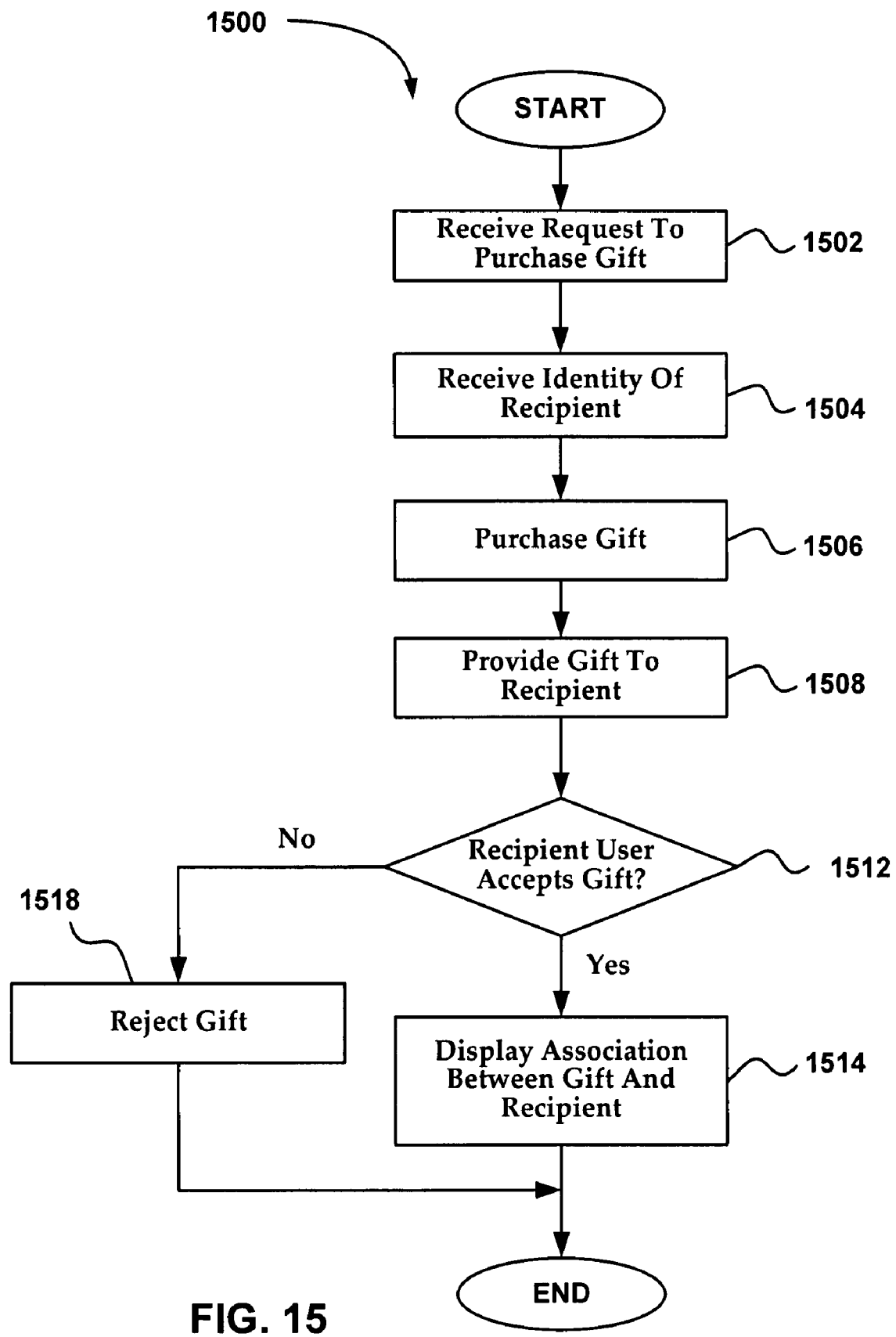
FIG. 15 is a flowchart of an exemplary process for purchasing and representing a gift in the social network environment of FIG. 1.

FIG. 15 is a flowchart of an exemplary process 1500 for purchasing a gift in a social network environment 100. In the process 1500, a user 102A purchases an asset via the social network provider 130 and gives the asset to a recipient user 102B in the social network environment 100.

In step 1502, the social network provider 130 receives a request from the user 102A to purchase a gift. In step 1504, the asset engine 135 receives an identity of the recipient user 102B from the user 102A. For example, the gift module 306 may receive the request and/or the identity. In step 1506, the social network provider 130 purchases the gift on behalf of the user 102A from a vendor, as discussed above in step 1404.

In step 1508, the gift module 306 provides the gift to the recipient user 102B. In various embodiments, providing a gift includes delivering the gift directly to the recipient user 102B or arranging delivery of the gift. For example, providing the gift to the recipient user 102A can include directing the asset vendor 104 to ship the gift to the recipient user 102A. Alternatively, when the gift is a digital or virtual asset, the social network provider may receive the gift and deliver the gift to the recipient user 102A. In some embodiments, the gift module 306 may notify the asset vendor 104 of the purchase of a virtual asset (e.g., a life in a game) and the recipient user 102B may claim the gift by logging on and playing the game.

In optional step 1512, it may be determined whether the recipient user 102B accepts the gift. The order of the steps in FIG. 15 may vary and the determination of whether the recipient user 102B accepts the gift may be made before providing the gift to the recipient user 102B. If the recipient user 102B accepts the gift then the process 1500 proceeds to step 1514.

In step 1514, an association between the gift and the recipient user 102B is displayed in the social network environment 100, for example, by the asset engine 135. In some embodiments, only a user 102C who is a friend of the recipient user 102B (or has some other determined relationship) may view the gift. The order of the steps in FIG. 15 may vary and the association between the gift and the recipient user 102B may be displayed in step 1514 before the determination of whether the recipient user 102B accepts the gift in step 1512.

If the gift module 306 determines that the user 102A is not a member of the social network or determines that the recipient user 102B does not accept the gift, then the process 1500 proceeds to step 1518. In step 1518, the gift module 306 rejects the gift. The process 1500 then ends. If the gift is a digital or virtual asset, the gift module 306 can remove the gift from the digital asset database 302 as part of rejecting the gift. In some embodiments, the gift module 306 can cancel shipment with the asset vendor 104 when the gift is a real asset.

Figure 16:
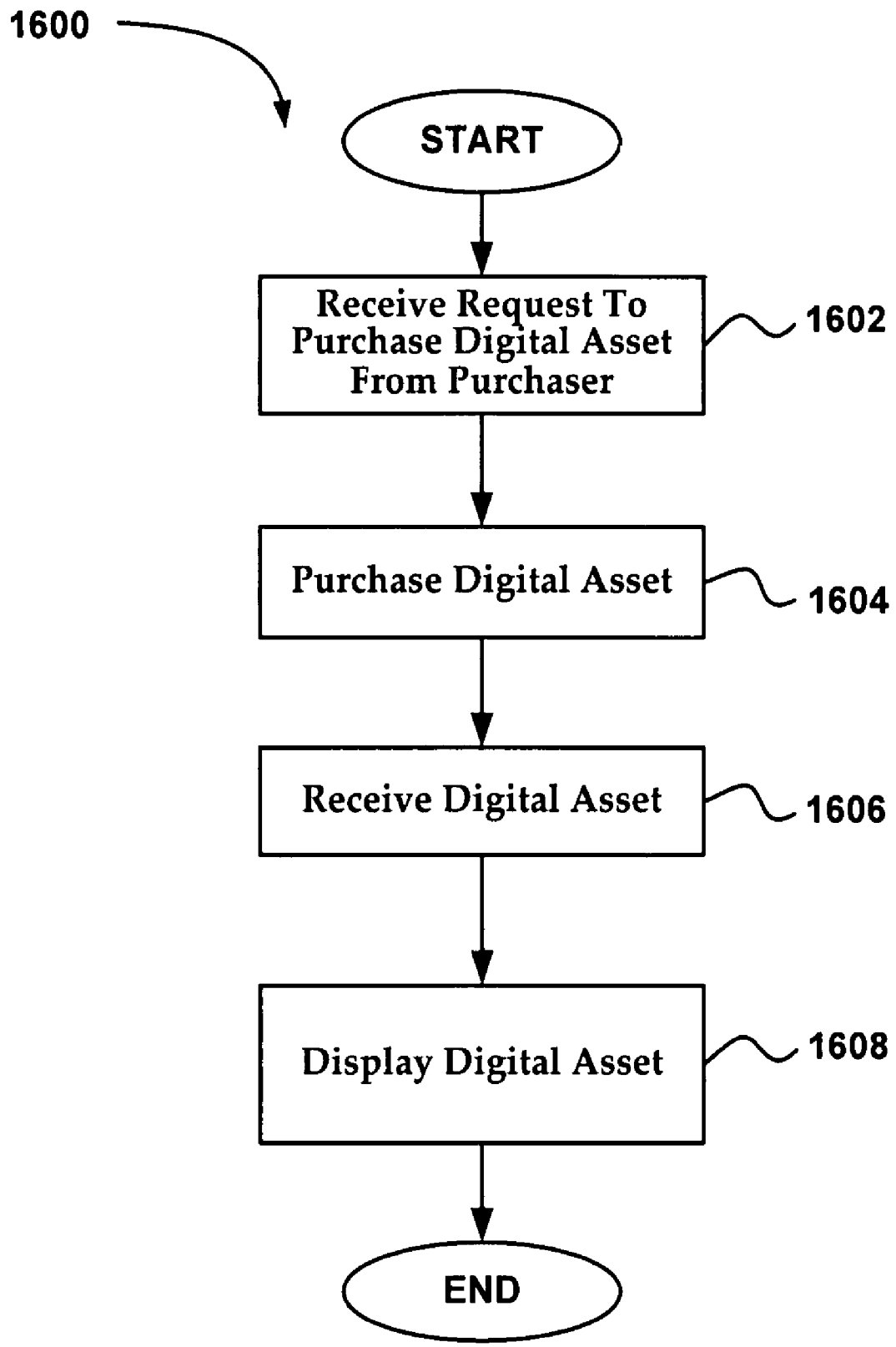
FIG. 16 is a flowchart of an exemplary process for resenting a digital asset in the social network environment of FIG. 1.

FIG. 16 is a flowchart of an exemplary process 1600 for purchasing and displaying a digital asset in a social network environment 100.

In step 1602, the social network provider 130 receives a request from a user 102A to purchase the digital asset.

In step 1604, the social network provider 130 purchases the digital asset on behalf of the user 102A, for example from an asset vendor 104.

In step 1606, the social network environment 100 receives the digital asset. The digital asset may be received from the asset vendor 104. Alternatively, the user 102A may receive the digital asset directly from the vendor and upload the digital asset to the social network environment 100.

In step 1608, the asset engine 135 displays the digital asset in the social network environment 100.

Several embodiments are specifically illustrated and/or described herein. However, it will be appreciated that modifications and variations are covered by the above teachings and within the scope of the appended claims without departing from the spirit and intended scope thereof. Various embodiments of the invention include logic stored on computer readable media, the logic configured to perform methods of the invention.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method for representing ownership of an asset in a social network environment, the method comprising:
   receiving a request from a first user of the social network environment to purchase the asset for a second user;
   recording information about a purchase of the asset from a vendor;
   associating, by a server for the social networking environment, the purchased asset with a profile of the second user;
   sending for display to a viewing user an association between the purchased asset and the second user on a feed display page;
   sending for display to the viewing user, in connection with the association between the purchased asset and the second user, information indicating that a third user, with whom the viewing user has established a connection in the social network, owns the asset, and information including a name of the first user who gave the asset to the second user, on the feed display page.

2. The method of claim 1, wherein the purchased asset comprises a real asset.

3. The method of claim 1, wherein the purchased asset comprises a virtual asset.

4. The method of claim 1, wherein the purchased asset comprises a digital asset.

5. The method of claim 4, wherein displaying to a viewing user the association comprises displaying the digital asset on a webpage associated with the profile of the second user in the social network environment.

6. The method of claim 1, wherein displaying to a viewing user the association comprises displaying an icon representing the asset on a webpage associated with the profile of the second user in the social network environment.

7. The method of claim 1, wherein recording information about the purchase of the asset comprises recording information about transferring money from the user to the vendor.

8. The method of claim 1, wherein recording information about the purchase of the asset comprises recording information about:
   receiving money from the user;
   transferring the money to the vendor;
   receiving the asset from the vendor; and
   providing the asset to the user.

9. The method of claim 1, wherein recording information about the purchase of the asset further comprises recording information about:
   transferring the money from the user to the vendor; and
   transferring the asset from the vendor to the user.

10. The method of claim 1, wherein the vendor is a third party vendor.

11. The method of claim 1, wherein the vendor is another user of the social network environment.

12. The method of claim 1, wherein the vendor is the social network provider.

13. The method of claim 1, further comprising receiving a fee from the vendor.

14. The method of claim 1, further comprising receiving a fee from the user.

15. The method of claim 1, wherein the viewing user comprises the first user, the second user, or another user who has an established connection with the first user or the second user.

16. The method of claim 1, wherein displaying to a viewing user an association comprises displaying the association on a web page associated with the first user.

17. The method of claim 1, wherein displaying to a viewing user an association comprising displaying the association on a news feed display page in the social network environment.

18. A method for buying a gift in a social network environment, the method comprising:
   receiving a request from a first user of the social network environment to purchase the gift;
   receiving from the first user an identity of a second user of the social network environment designated to receive the gift;
   recording information about a purchase of the gift from a vendor;
   associating, by a server for the social networking environment, the purchased gift with a profile for the second user;
   sending for display to a viewing user an association between the purchased gift and the second user in the social network environment on a feed display page;
   sending for display to the viewing user, in connection with the association between the purchased gift and the second user, information indicating that a third user, with whom the viewing user has established a connection in the social network, owns the gift, and information including a name of the first user who gave the gift to the second user, on the feed display page.

19. The method of claim 18, wherein receiving a request to purchase the gift further comprises:
   providing a list of one or more gifts to the first user; and
   receiving a selection from the first user of a gift in the list.

20. The method of claim 18, wherein recording information about the purchase of the gift comprises recording information about delivering the gift directly to the second user.

21. The method of claim 18, wherein recording information about the purchase of the gift comprises recording information that the second user is entitled to receive a gift from the vendor.

22. The method of claim 18, wherein recording information about the purchase of the gift comprises recording information about directing a vendor to deliver the gift to the second user.

23. The method of claim 18, wherein the gift comprises a real asset.

24. The method of claim 18, wherein the gift comprises a virtual asset.

25. The method of claim 18, wherein the gift comprises an icon.

26. The method of claim 18, wherein the gift comprises a digital asset.

27. The method of claim 26, wherein displaying to a viewing user an association further comprises displaying the gift on a webpage associated with the first user in the social network environment.

28. The method of claim 26, wherein displaying to a viewing user an association further comprises displaying the gift on a webpage associated with the second user in the social network environment.

29. The method of claim 18, further comprising receiving information about whether the second user accepted the gift.

30. The method of claim 18, further comprising receiving a fee from the vendor.

31. The method of claim 18, further comprising receiving a fee from the user.

32. The method of claim 18, further comprising determining if the second user accepts the gift and wherein displaying to a viewing user an association further comprises displaying an icon representing the gift on a webpage associated with the second user only if the second user accepts the gift.

33. The method of claim 18, wherein the viewing user comprises the first user, the second user, or another user who has an established connection with the first user or the second user.

34. The method of claim 18, wherein displaying to a viewing user an association comprises displaying the association on a web page associated with the first user.

35. The method of claim 18, wherein displaying to a viewing user an association comprises displaying the association on a news feed display page in the social network environment.

36. A method for representing a digital asset in a social network environment, the method comprising:
   receiving a request from a first user of the social network environment to purchase the digital asset for a second user;
   recording information about a purchase of the digital asset from a vendor for the user;
   associating, by a server for the social networking environment, the digital asset with a profile for the second user;
   sending for display to a viewing user an association between the digital asset and the second user on a feed display page;
   sending for display to the viewing user, in connection with the association between the digital asset and the second user, information indicating that a third user, with whom the viewing user has established a connection in the social network, owns the digital asset, and information including a name of the first user who gave the digital asset to the second user, on the feed display page.

37. The method of claim 36, further comprising displaying an icon representing the digital asset.

38. The method of claim 36, further comprising recording information about the transfer of the digital asset to the user.

39. The method of claim 36, further comprising displaying contents of the digital asset.

40. The method of claim 36, further comprising attaching advertising to the digital asset.

41. The method of claim 36, further comprising receiving a fee from the vendor.

42. The method of claim 36, further comprising receiving a fee from the user.

43. The method of claim 36, wherein the viewing user comprises the first user, the second user, or another user who has an established connection with the first user or the second user.

44. The method of claim 36, wherein displaying to a viewing user an association comprises displaying the association on a web page associated with the second user.

45. The method of claim 36, wherein displaying to a viewing user an association comprises displaying the association on a news feed display page in the social network environment.

46. A method for buying a gift in a social network environment, the method comprising:
   receiving a request from a first user of the social network environment to purchase the gift;
   receiving from the first user an identity of a second user of the social network environment designated to receive the gift;
   recording information about a purchase of the gift for the second user;
   associating, by a server for the social networking environment, the purchased gift with a profile for the second user;
   sending for display to a viewing user an association between the purchased gift and the second user in the social network environment on a news feed display page in the social network environment;
   sending for display to the viewing user, in connection with the association between the purchased gift and the second user, a link to the profile of the second user and a link to purchase the gift, information indicating that a third user, with whom the viewing user has established a connection in the social network, owns the gift, and information including a name of the first user who gave the gift to the second user, on the news feed display page.

47. The method of claim 46, wherein the viewing user comprises the first user, the second user or another user who has an established connection with the first user or the second user.

48. The method of claim 46, wherein the news feed display page displays a plurality of purchased gifts associated with users of the social network environment who have established connections with the viewing user.

49. The method of claim 46, wherein the gift comprises a real asset.

50. The method of claim 46, wherein the gift comprises a virtual asset.

51. The method of claim 46, wherein the gift comprises an icon.

52. The method of claim 46, wherein the gift comprises a digital asset.

\* \* \* \* \*